United States Patent
Paquette

(10) Patent No.: US 12,511,680 B2
(45) Date of Patent: *Dec. 30, 2025

(54) EQUIPMENT RECOMMENDATION SYSTEMS AND METHODS

(71) Applicant: BAUER HOCKEY LLC, Exeter, NH (US)

(72) Inventor: Yannick Paquette, Blainville (CA)

(73) Assignee: BAUER HOCKEY LLC, Exeter, NH (US)

( * ) Notice: Subject to any disclaimer, the term of this patent is extended or adjusted under 35 U.S.C. 154(b) by 311 days.

This patent is subject to a terminal disclaimer.

(21) Appl. No.: 16/162,927

(22) Filed: Oct. 17, 2018

(65) Prior Publication Data

US 2019/0114690 A1 Apr. 18, 2019

Related U.S. Application Data

(60) Provisional application No. 62/574,096, filed on Oct. 18, 2017.

(51) Int. Cl.
G06Q 30/00 (2023.01)
A63B 24/00 (2006.01)
(Continued)

(52) U.S. Cl.
CPC ..... G06Q 30/0631 (2013.01); A63B 24/0006 (2013.01); A63B 59/70 (2015.10);
(Continued)

(58) Field of Classification Search
CPC . A63B 59/70; A63B 24/0006; A63B 2102/24; A63B 2220/803;
(Continued)

(56) References Cited

U.S. PATENT DOCUMENTS 7,621,828 B2 * 11/2009 Voges ............... A63B 57/00
473/409
9,261,526 B2 2/2016 Bentley
(Continued)

FOREIGN PATENT DOCUMENTS

| CA | 2146527 A | * 10/1996 | ............. A63B 69/00 |
| CA | 2948453 | 5/2017 | |
| WO | 2017127492 | 7/2017 | |

OTHER PUBLICATIONS

Jones, Jacqueline L. "The Efficacy of Concurrent, Multimodal, Augmented Feedback for Golf Kinematic Sequence Training." Order No. 10188445 Illinois State University, 2017. Ann Arbor: ProQuest. Web. Jun. 28, 2021. (Year: 2017).*

(Continued)

Primary Examiner — Jeffrey A. Smith
Assistant Examiner — Kennedy Gibson-Wynn

(57) ABSTRACT

A computer-implemented method for recommending an item of equipment, which comprises: gathering sensed data from a sensor; processing the sensed data in accordance with a biomechanical protocol to determine at least one performance indicator associated with a subject's execution of the biomechanical protocol; and determining at least one recommended feature of an item of equipment based at least in part on the at least one performance indicator. Also, an equipment recommendation system with specific application to hockey, which comprises: a camera configured to produce images representative of execution of a hockey shot of a given type by a subject; an I/O interface; and a processor connected to the camera via the I/O interface and configured to extract parameters from the images and to output, via the I/O interface, a hockey stick recommendation for the subject that is based on the parameters and on the given type of hockey shot.

30 Claims, 19 Drawing Sheets

(51) Int. Cl.
   *A63B 59/70*      (2015.01)
   *A63B 69/00*      (2006.01)
   *G06Q 30/0601*    (2023.01)
   *G06V 40/20*      (2022.01)

(52) U.S. Cl.
   CPC .......... *A63B 69/0026* (2013.01); *G06V 40/23* (2022.01); *A63B 2220/803* (2013.01); *A63B 2220/836* (2013.01)

(58) Field of Classification Search
   CPC .... A63B 2220/836; A63B 24/00–0003; A63B 24/0062; A63B 69/0024–0026; A63B 69/3632; A63B 2102/22–34; G06Q 30/0601–0645; G06Q 30/0631; G06Q 30/0621; G06K 9/00342; G06K 9/00724
   See application file for complete search history.

(56) References Cited

U.S. PATENT DOCUMENTS

| | | | |
|---|---|---|---|
| 9,384,244 B1* | 7/2016 | Garg | A63B 24/0062 702/145 |
| 9,489,494 B2 | 11/2016 | Ripp et al. | |
| 9,694,267 B1* | 7/2017 | Thornbrue | A63B 69/0002 |
| 9,744,422 B2 | 8/2017 | Ripp et al. | |
| 9,950,237 B2 | 4/2018 | Kline et al. | |
| 10,004,949 B2 | 6/2018 | Brothers et al. | |
| 10,008,126 B1* | 6/2018 | Linderman | A61B 5/389 |
| 10,071,299 B2 | 9/2018 | Ripp et al. | |
| 10,080,941 B2 | 9/2018 | Brekke et al. | |
| 10,463,958 B2 | 11/2019 | Bentley | |
| 10,543,415 B2 | 1/2020 | Ripp et al. | |
| 10,639,528 B2 | 5/2020 | Stefanyshyn et al. | |
| 10,682,562 B2 | 6/2020 | Syed et al. | |
| 2002/0123386 A1 | 9/2002 | Perlmutter | |
| 2004/0192477 A1 | 9/2004 | Flaum | |
| 2009/0029754 A1 | 1/2009 | Slocum | |
| 2009/0221388 A1 | 9/2009 | Giannetti | |
| 2013/0211774 A1* | 8/2013 | Bentley | A63B 24/0062 702/145 |
| 2014/0149259 A1* | 5/2014 | Grace | G06Q 30/0601 705/26.64 |
| 2014/0343898 A1 | 11/2014 | Thurman | |
| 2014/0357426 A1 | 12/2014 | Ishikawa | |
| 2015/0057111 A1* | 2/2015 | Tremblay-Munger | A63B 59/70 473/446 |
| 2015/0363865 A1* | 12/2015 | Ramanuja | G06Q 30/0631 705/26.62 |
| 2015/0367222 A1* | 12/2015 | Ripp | A63B 24/0062 473/221 |
| 2016/0180440 A1* | 6/2016 | Dibenedetto | A61B 5/112 705/26.7 |
| 2016/0303443 A1 | 10/2016 | Boggs et al. | |
| 2016/0322078 A1* | 11/2016 | Bose | A63B 71/06 |
| 2017/0028253 A1* | 2/2017 | Hagiwara | A63B 24/0006 |
| 2017/0136326 A1* | 5/2017 | Stefanyshyn | A63B 69/3605 |
| 2017/0165549 A1* | 6/2017 | Stenzler | A63B 60/24 |
| 2017/0178218 A1* | 6/2017 | Feris | G06Q 30/0633 |
| 2017/0193140 A1 | 7/2017 | Brothers et al. | |
| 2017/0246521 A1 | 8/2017 | Degreef et al. | |
| 2017/0274256 A1* | 9/2017 | Brekke | A63B 60/46 |
| 2018/0150885 A1* | 5/2018 | Albinger | G06Q 30/0251 |
| 2018/0200604 A1 | 7/2018 | Kline | |
| 2018/0290043 A1 | 10/2018 | Guillemette | |
| 2018/0295419 A1* | 10/2018 | Thielen | H04N 21/44218 |
| 2018/0357472 A1 | 12/2018 | Dreessen | |
| 2020/0070019 A1 | 3/2020 | Wallans et al. | |
| 2020/0276488 A1 | 9/2020 | Cottam | |
| 2020/0298094 A1 | 9/2020 | Syed et al. | |
| 2022/0023730 A1 | 1/2022 | Howenstein et al. | |
| 2022/0027978 A1 | 1/2022 | Paquette | |

OTHER PUBLICATIONS

Magee, Patrick Michael. "Whole-Body Predictors of Wrist Shot Accuracy in Ice Hockey: A Kinematic Analysis by Way of Motion Capture." Order No. MR61645 McGill University (Canada), 2009. Ann Arbor: ProQuest. Web. Jul. 11, 2022. (Year: 2009).*

Wu, Tong-Ching Tom. "The Performance of the Ice Hockey Slap and Wrist Shots: The Effects of Stick Construction and Player Skill" Order No. MQ79052 McGill University (Canada), 2002. Ann Arbor: ProQuest. Web. Nov. 14, 2022. (Year: 2002).*

Flemming, Andrew. "The Dynamic Interaction of Hand Grip and Ice Hockey Stick Flexion during Slap Shots and Wrist Shots." Order No. 28253543 McGill University (Canada), 2014. Ann Arbor: ProQuest. Web. Nov. 14, 2022. (Year: 2014).*

Kays BT, Smith LV (2014) Field measurements of ice hockey stick performance and player motion. Procedia Eng 72: 563-568 (Year: 2014).*

Chambers, Ryan, et al. "The use of wearable microsensors to quantify sport-specific movements." Sports medicine 45 (2015): 1065-1081. (Year: 2015).*

Lomond, K. V., R. A. Turcotte, and D. J. Pearsall. "Three-dimensional analysis of blade contact in an ice hockey slap shot, in relation to player skill." Sports Engineering 10 (2007): 87-100. (Year: 2007).*

Larson, David P., and Benjamin C. Noonan. "A simple video-based timing system for on-ice team testing in ice hockey: A technical report." The Journal of Strength & Conditioning Research 28.9 (2014): 2697-2703. (Year: 2014).*

H. Shimada, K. Watanabe, K. Kobayashi and Y. Kurihara, "Measurement and analysis of batting swing in baseball using acceleration and angular velocity sensors," SICE Annual Conference 2011, Tokyo, Japan, 2011, pp. 1120-1124. (Year: 2011).*

H. Brock and Y. Ohgi, "Assessing Motion Style Errors in Ski Jumping Using Inertial Sensor Devices," in IEEE Sensors Journal, vol. 17, No. 12, pp. 3794-3804, Jun. 15, 2017, doi: 10.1109/JSEN.2017.2699162. (Year: 2017).*

Examiner's Report issued by the Canadian Intellectual Property Office on Nov. 21, 2019 in connection with CA patent application No. 3,021,350—5 pages.

Office Action issued by the Swedish Patent Office on Mar. 19, 2020 in connection with SE patent application No. 1851277-2—8 pages.

Examiner's Report issued by the Canadian Intellectual Property Officeon Jul. 16, 2020 in connection with CA patent application No. 3,021,350—3 pages.

TMPC—Montreal | Taylormade Fitting found at http://www.taylormadefitting.ca/tmpc-montreal/, accessed on Dec. 14, 2018—11 pages.

Natural Sciences and Engineering Research Council of Canada Award Details, Integrative Performance Sensor for Ice Hockey, 2012, NIGG, Benno, Fiscal year 2013-2014.

Natural Sciences and Engineering Research Council of Canada Award Details, Integrative Performance Sensor for Ice Hockey, 2012, NIGG, Benno, Fiscal year 2014-2015.

Natural Sciences and Engineering Research Council of Canada Award Details, Integrative Performance Sensor for Ice Hockey, 2012, NIGG, Benno, Fiscal year 2015-2016.

Natural Sciences and Engineering Research Council of Canada Award Details, Ice Hockey Shot Motion Extraction from Stereo Videos, 2016, Mudur, SudhirPandurang.

Natural Sciences and Engineering Research Council of Canada Award Details, Ice Hockey Shot Motion Extraction from Stereo Videos, 2017, Popa, Tiberiu.

TaylorMade Montreal Performance Center Website, http://www.taylormadefitting.ca/tmpc-montreal/, as accessed on Dec. 14, 2018.

Office Action issued by the Swedish Patent and Registration Office on Apr. 17, 2019 in connection with Swedish patent application No. 1851277-2.

Examiner's Report issued on Feb. 14, 2023 in connection with Canadian Patent Application No. 3021350, 5 pages.

Office Action issued by the Swedish Patent Office on Feb. 23, 2022 in connection with SE patent application No. 1851277-2, 14 pages.

(56) References Cited

OTHER PUBLICATIONS

Examiner's Report issued on May 29, 2024 in connection with Canadian Patent Application No. 3,021,350, 6 pages.
Examiner-Initiated Interview Summary issued on May 8, 2024 in connection with U.S. Appl. No. 17/497,378, 1 page.
Non-Final Office Action issued on May 22, 2024 in connection with U.S. Appl. No. 17/497,378, 45 pages.
Final Office Action issued on Jul. 2, 2025 in connection with U.S. Appl. No. 17/497,378, 40 pages.
T. Zebin, P. Scully and K. B. Ozanyan, "Inertial sensing for gait analysis and the scope for sensor fusion," 2015 IEEE Sensors, Busan, Korea (South), 2015, pp. 1-4, doi: 10.1109/ICSENS.2015.7370262. (Year: 2015).

* cited by examiner

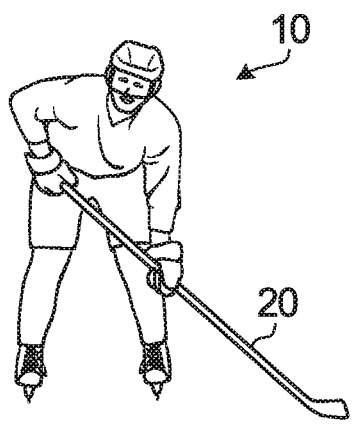
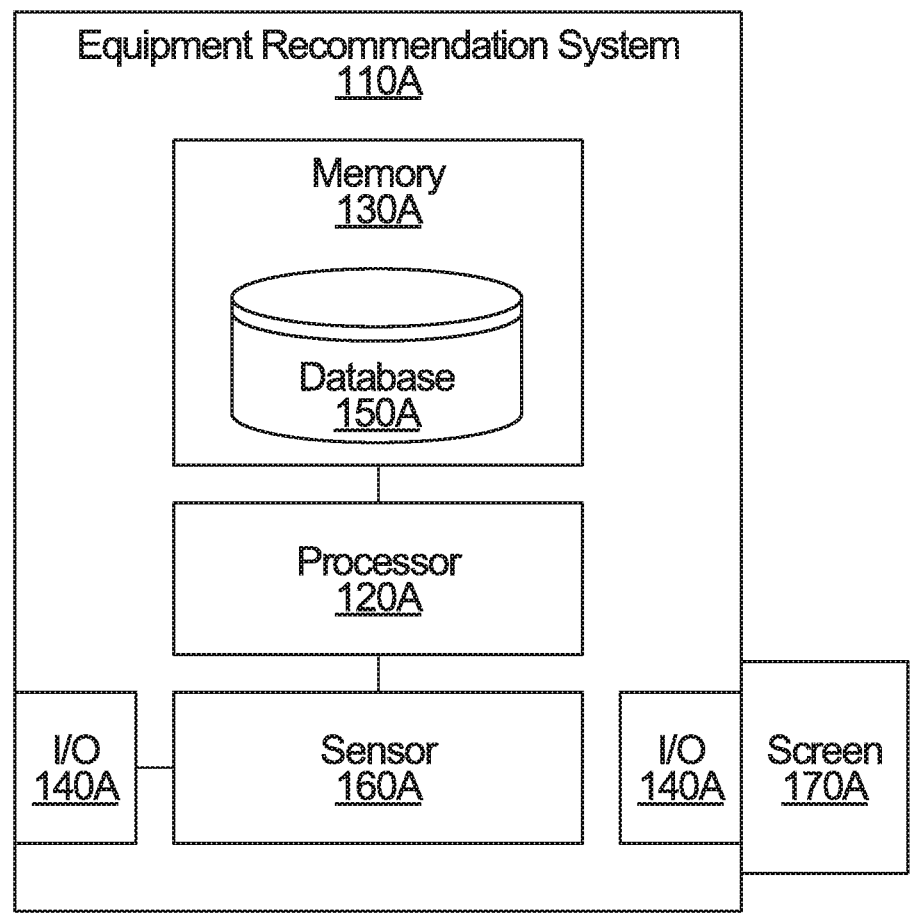
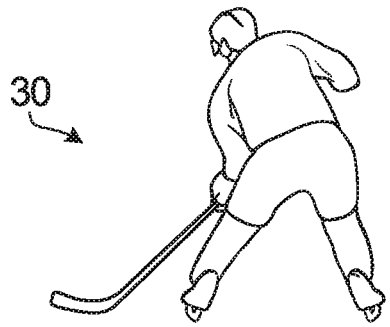
FIG. 1A

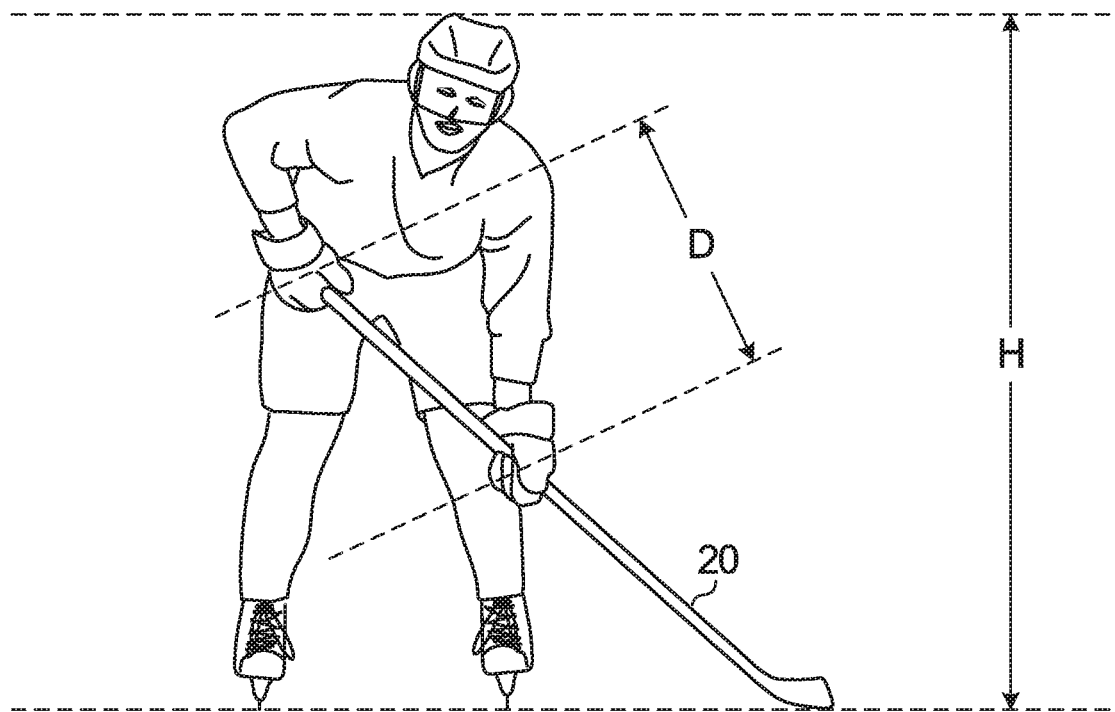
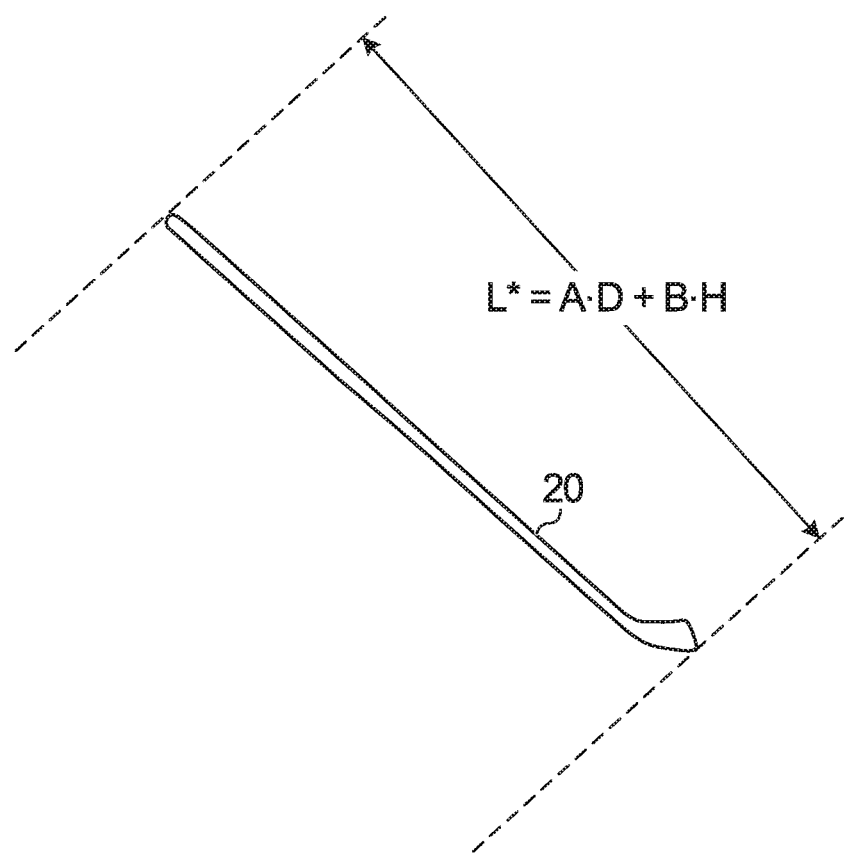
FIG. 5

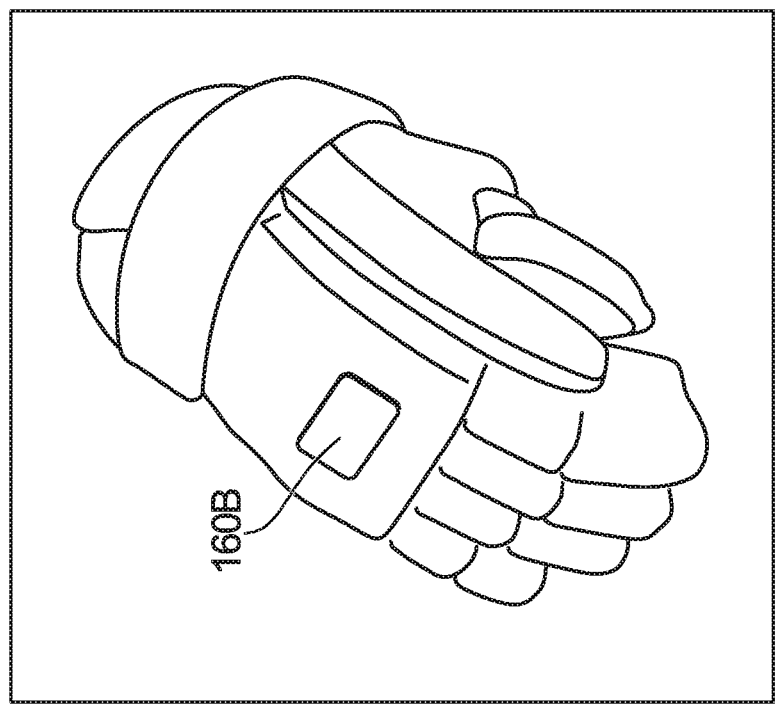
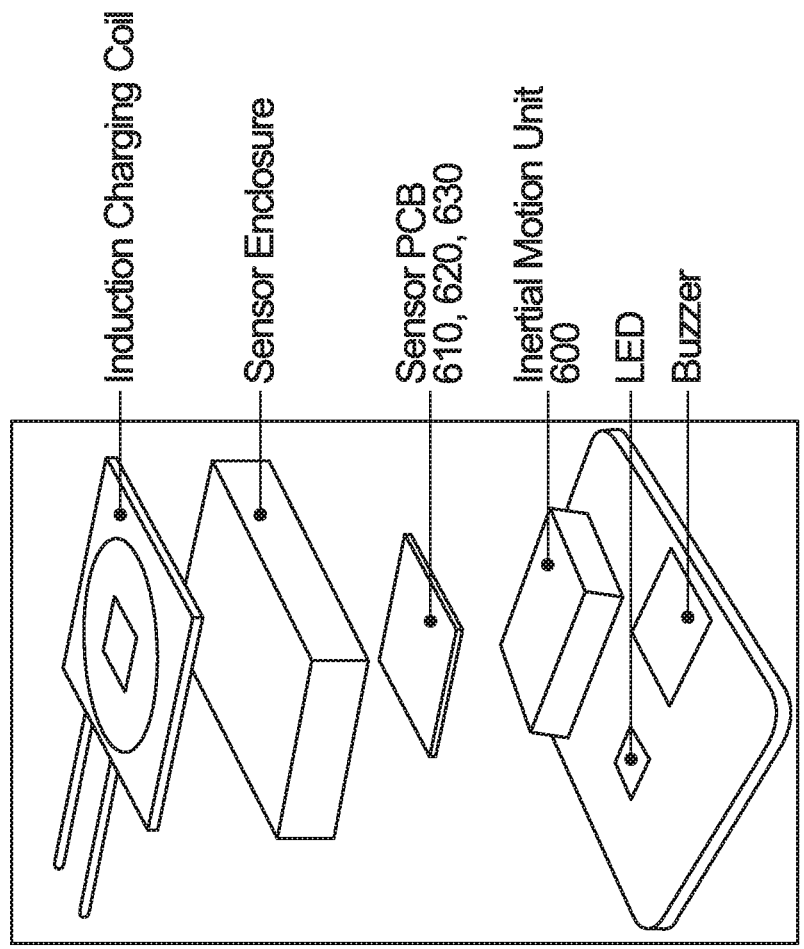
FIG. 6

| Blade Specs | | | | | Shooting stance | Wrist Shot | | | Slap Shot | | |
|---|---|---|---|---|---|---|---|---|---|---|---|
| Pattern | Curve | Face | Blade Length | Lie Angle | | Puck impulse Time | Off-Axis Spin / Z-axis Spin (%) | Max Angular Velocity | Puck impulse Time | Off-Axis Spin / Z-axis Spin (%) | Max Angular Velocity |
| P88 | Mid Heel | Closed | Mid | 6 | | 60-80 ms | > 35 % | 1500-2000 deg/s | 25-35 ms | > 35 % | 2000-2500 deg/s |
| P89 | Mid | Closed | Mid | 6 | | 60-80 ms | > 35 % | > 2000 deg/s | 25-35 ms | > 35 % | > 2500 deg/s |
| P14 | Mid Toe | Closed | Mid | 6 | | 80-100 ms | > 35 % | 1500-2000 deg/s | 35-55 ms | > 35 % | 2000-2500 deg/s |
| P106 | Heel | Neutral | Mid | 6 | | 60-80 ms | 25-35% | < 1500 deg/s | 25-35 ms | 25-35% | < 2000 deg/s |
| P02 | Heel | Neutral | Long | 7 | | > 100 ms | 25-35% | < 1500 deg/s | > 55 ms | 25-35% | < 2000 deg/s |
| P12 | Heel | Neutral | Short | 7 | | < 60 ms | 25-35% | < 1500 deg/s | < 25 ms | 25-35% | < 2000 deg/s |
| PM9 | Mid Heel | Neutral | Mid | 5 | | 60-80 ms | 25-35% | 1500-2000 deg/s | 25-35 ms | 25-35% | 2000-2500 deg/s |
| P92 Lie 5 | Mid Toe | Neutral | Mid Long | 5 | Crouched | 80-100 ms | 25-35% | > 2000 deg/s | 35-55 ms | 25-35% | > 2500 deg/s |
| P92 | Mid Toe | Neutral | Mid Long | 6 | Normal | 80-100 ms | 25-35% | > 2000 deg/s | 35-55 ms | 25-35% | > 2500 deg/s |
| P28 | Mid Toe | Neutral | Mid | 5 | | 60-80 ms | 25-35% | > 2000 deg/s | 25-35 ms | 25-35% | > 2500 deg/s |
| P91 | Mid Toe | Open | Long | 5 | Crouched | > 100 ms | < 25 % | > 2000 deg/s | > 55 ms | < 25% | > 2500 deg/s |
| P91A | Mid Toe | Open | Long | 6 | Normal | > 100 ms | < 25 % | > 2000 deg/s | > 55 ms | < 25% | > 2500 deg/s |

FIG. 13

EQUIPMENT RECOMMENDATION SYSTEMS AND METHODS

CROSS-REFERENCE TO RELATED APPLICATION

The present application claims the benefit under 35 U.S.C. 119(e) of U.S. Provisional Patent Application Ser. No. 62/574,096, filed on Oct. 18, 2017 and hereby incorporated by reference herein.

FIELD

The present invention relates in general to equipment such as sporting gear and, in particular, to a method and system for recommending certain equipment as being suitable for a consumer when a multiplicity of choices is available.

BACKGROUND

Purchasing decisions for equipment, such as hockey equipment and other sporting gear, are made based on a variety of assumptions. For example, a consumer may believe that a hockey stick having certain features is right for him or her based on what the consumer may have read or heard, including advertising material. However, this decision is made based on limited information and may not result in choosing the stick that is indeed best suited to that consumer's specific style of play. As such, the consumer may be disappointed with the performance he or she is able to achieve with the chosen stick, and this negative connotation may transfer over to the brand or manufacturer of the stick. Thus, it will be appreciated that, in general, equipment manufacturers that offer multiple choices of equipment but are unable to clearly guide their consumers to making the appropriate choice for them may be at a disadvantage. A solution would therefore be welcomed in the industry.

SUMMARY

In accordance with a first aspect, there is provided a computer-implemented method for recommending an item of equipment, which comprises: gathering sensed data from a sensor; processing the sensed data in accordance with a biomechanical protocol to determine at least one performance indicator associated with a subject's execution of the biomechanical protocol; and determining at least one recommended feature of an item of equipment based at least in part on the at least one performance indicator.

In accordance with another aspect, there is provided a system, which comprises a sensor and a processor configured to gather sensed data from the sensor and to process the sensed data in accordance with an identified biomechanical protocol to determine at least one recommended feature of an item of equipment.

In accordance with another aspect, there is provided an equipment recommendation system, which comprises: a camera configured to produce images representative of execution of a hockey shot of a given type by a subject; an I/O interface; and a processor connected to the camera via the I/O interface and configured to extract parameters from the images and to output, via the I/O interface, a hockey stick recommendation for the subject that is based on the parameters and on the given type of hockey shot.

In accordance with another aspect, there is provided an equipment recommendation method, which comprises obtaining images representative of execution of a hockey shot of a given type by a subject; processing the images to extract a set of parameters from the images; and producing a hockey stick recommendation for the subject based on the parameters and on the given type of hockey shot.

In accordance with another aspect, there is provided a computer-readable medium which comprises computer-readable instructions which, when executed by a processor, cause the processor to carry out an equipment recommendation method that includes obtaining images representative of execution of a hockey shot of a given type by a subject; extracting parameters from the images; and causing output of a hockey stick recommendation for the subject produced at least partly on the basis of the parameters and on the given type of hockey shot.

BRIEF DESCRIPTION OF THE DRAWINGS

Reference is now made to the drawings, which are to be considered non-limiting, and wherein:

FIGS. 1A-1C are schematic block diagrams of an equipment recommendation system, in accordance with various non-limiting embodiments.

FIG. 5 illustrates computation of a variable of interest from measured data, in accordance with a non-limiting embodiment.

FIG. 6 shows construction of a sensor for use with a glove, in accordance with a non-limiting embodiment.

FIG. 13 is a table illustrating data that maps blade specs to combinations of extracted VOI values, in accordance with a non-limiting embodiment.

DETAILED DESCRIPTION

The present document provides a description of certain non-limiting example embodiments of an equipment recommendation system and method, e.g., a system and method for determining recommended features of an item of equipment within an equipment class. While certain example embodiments will be described in the context of a specific sport (e.g., ice hockey) and a specific equipment class (e.g., a hockey stick), the present description should be considered non-limiting, as certain aspects are applicable to other activities (including other sports) involving physical techniques, as well as other equipment classes.

Figure 1B:
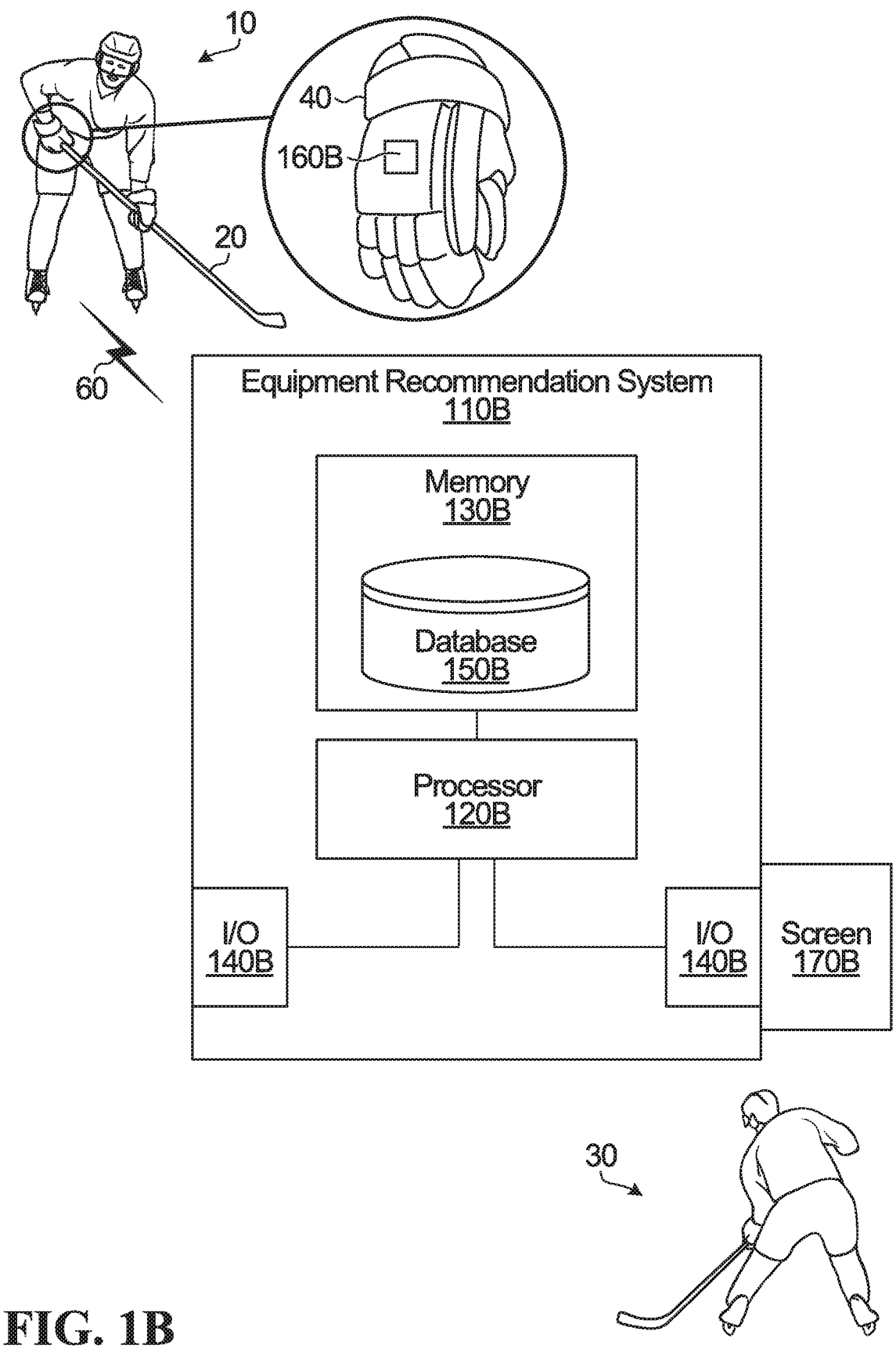
Figure 1C:
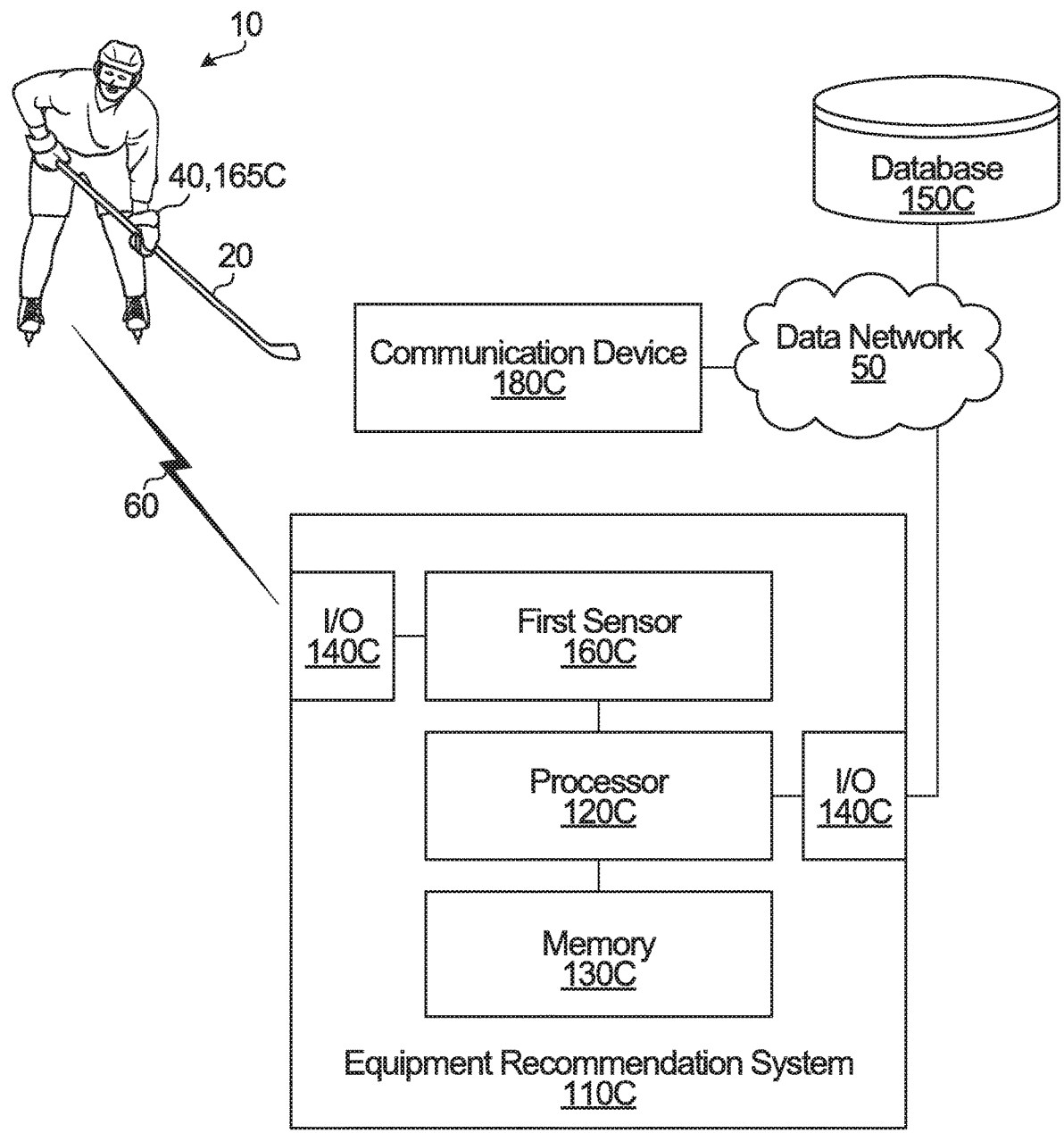

To this end, reference is made to FIGS. 1A, 1B and 1C showing a subject (e.g., an ice hockey player, hereinafter "player") 10 holding a hockey stick 20. In accordance with certain embodiments, the player 10 executes a shooting protocol during which the player 10 manipulates the stick to shoot, or simulate shooting, a hockey puck, for example, using certain specified shot types (e.g., wrist shot, slap shot). Naturally, for the purposes of executing the shooting protocol, the player (subject) 10 need not be actually involved in on-ice gameplay during, although this is possible in some embodiments as will be described herein below. As will be described herein below, one or more sensors of an equipment recommendation system captures sensed data during execution of the shooting protocol. The sensed data is processed by a computing device of the equipment recommendation system, resulting in the determining of recommended features of an item of equipment for the player.

FIGS. 1A, 1B and 1C show different non-limiting implementations of an equipment recommendation system. In FIG. 1A, an equipment recommendation system 100A includes a computing device 110A comprising a system processor 120A, a system memory 130A, an I/O (input-output) 140A, a database 150A and a sensor 160A. The computing device 110A could be a desktop, laptop, tablet or smartphone, to name a few non-limiting possibilities. The database 150A may be implemented as part of the system memory 130A but is given a dedicated reference numeral to denote its role as a repository of information. The I/O 140A may be connected to a screen 170A (which may be a touch screen and may be integrated with the computing device 110A), allowing the system processor 120A to control what is displayed to a user 30 of the computing device 110A. In this implementation, the sensor 160A is integrated with the computing device 110A and may have its own data capture and storage capabilities or it may utilize those of the system processor 120A and the system memory 130A. An example of a sensor that may be suitable for the implementation shown in FIG. 1A could be a camera, such as a CCD (charge-coupled device), integrated into a smartphone (such as models of the iPhone).

In FIG. 1B, an equipment recommendation system 100B includes a computing device 110B comprising a system processor 120B, a system memory 130B, an I/O (input-output) 140B and a database 150B. The computing device 110B could be a desktop, laptop, tablet or smartphone, to name a few non-limiting possibilities. The database 150B may be implemented as part of the system memory 130B but is given a dedicated reference numeral to denote its role as a repository of information. The I/O 140B may be connected to a screen 170B, allowing the system processor 120B to control what is displayed to the user 30 of the computing device 110B. In this implementation, a sensor 160B is provided on equipment used by the player 10 executing the shooting protocol (e.g., embedded in a pair of gloves 40 worn by the player 10 or in the hockey stick 20 itself). The sensor 160B may have its own data capture and storage capabilities, as well as an I/O for communicating sensed data to the computing device 110B, e.g., wirelessly over a wireless link 60. The I/O 140B of the computing device 110B will thus have complementary wireless communication capability so as to receive the data transmitted by the sensor 160B. In a variant, the I/O 140B may also be used to control operation the sensor 160B. An example of a sensor 160B that may be suitable for the implementation shown in FIG. 1B could be an inertial motion sensor, such as a gyroscope or accelerometer, that is set into motion by the player 10 and communicates with the computing device 110B over the wireless link 60 (such as over WiFi). In a variant, the sensor 160B may comprise a remote camera that communicates with the computing device 110B over a network (not shown).

A further implementation is shown in FIG. 1C, in which an equipment recommendation system 100C includes a computing device 110C comprising a system processor 120C, a system memory 130C, an I/O (input-output) 140C, a database 150C, a first sensor 160C and a second sensor 165C. The computing device 110C could be a desktop, laptop or server, to name a few non-limiting possibilities. The database 150C may be implemented remotely from the computing device 110C (e.g., as a web server) and accessible via the I/O 140C of the computing device 110C. For example, the I/O 140C may have networking capabilities allowing the computing device 110C to connect over a data network 50 (e.g., the Internet). In this embodiment, the user 30 utilizes a communication device 180C to communicate with, control and receive data from the computing device 110C. Such communication may occur over the data network 50. In this implementation, the first sensor 160C (e.g., a camera) is integrated with the computing device 110C and may have its own data capture and storage capabilities or it may utilize those of the system processor 120C and the system memory 130C. For its part, the second sensor 165C (e.g., an inertial motion sensor) is provided on an item of equipment used by the player 10 executing the shooting protocol (e.g., embedded in the gloves 40 worn by the player 10 or in the hockey stick 20). The second sensor 165C may have its own data capture and storage capabilities, as well as an I/O for communicating sensed data to the computing device 110C, e.g., over a wireless link 60.

Generally speaking, any number of sensors could be provided in any of the implementations of the equipment recommendation system 100A/100B/100C, and their information could be combined and jointly processed. Sensors may be embedded in various items of equipment, such as items of protective equipment worn on areas of the body where the sensed data is expected to provide meaningful insight into the technique of the player 10. Examples of such items of equipment can include one or both of the player's gloves 40, one or both of the player's shoulder pads, one or both of the player's skates, the player's hockey pants and the player's helmet, to name a few non-limiting examples. Sensors may be integrated into items of specialized equipment worn by the player 10 and developed specifically for the equipment recommendation system 100A/100B/100C. Furthermore, sensors may be embedded into items of equipment that are not worn, but that may nevertheless allow the generation of sensed data providing meaningful insight into the technique of the player 10. Examples of such items of equipment, in the context of ice hockey, can include the hockey stick 20, a hockey puck, and boards of a rink, to name a few non-limiting examples. Different types of sensors may be used and may include, in addition to cameras, inertial motion sensors, pressure sensors, thermometers and hygrometers, to name just a few possibilities, which may be set into motion by the player 10. An item of equipment may include multiple sensors of the same type or different types.

It should also be appreciated that in some implementations, the user 30 and the player 10 may be one and the same individual. This would arise, in particular, in the implementations of FIGS. 1A and 1B, and where the equipment recommendation system 110A/110B is embodied as a smartphone used by the player 10 (who, it is recalled, is also the user 30).

While the remainder of this document will consider the implementations in FIGS. 1A and 1B, this is done only in the interest of simplicity and brevity, and it should be understood that certain teachings herein are also applicable to the implementation in FIG. 1C and other variants.

Applications and Processes

In the implementations of FIGS. 1A and 1B, the system processor 120A/120B is configured to execute computer-readable instructions stored in the system memory 130A. In so doing, the system processor 120A may implement an operating system as well as one or more processes and/or applications that achieve certain functions. In some embodiments, different processes can be associated with different sets of computer-readable instructions in the system memory 130A/130B, as now described.

Figure 2A:
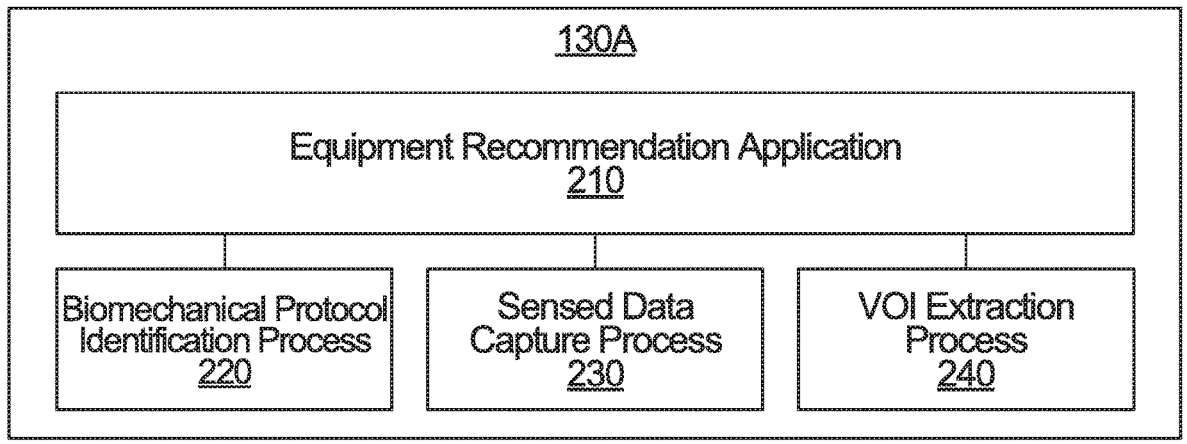
FIGS. 2A and 2B are functional block diagrams showing various processes used in the equipment recommendation system, in accordance with various non-limiting embodiments.

Specifically, with reference to FIG. 2A, which conceptually represents organization of the system memory 130A the implementation of FIG. 1A, the system memory 130A is seen to include computer-readable instructions corresponding to an equipment recommendation application 210, a biomechanical protocol identification process 220, a sensed data capture process 230 and a VOI ("variable of interest", also referred to as a performance indicator, key performance indicator (KPI) or "parameter") extraction process 240. In this implementation, it is recalled that the sensor 160A may be integrated with the computing device 110A.

As for the implementation of FIG. 1B, it is recalled that the sensor 160B is separate from the computing device 110C, such as in the case of an external camera remotely connected to the communication device 110C over a network, or in the case of an inertial motion sensor embedded in one or more items of equipment used by the player and communicating sensed data over the wireless link 60. To this end, and as shown in FIG. 6, the sensor 160B includes a specialized transducer 600 that depends on the nature of what is being sensed (e.g., pressure, motion, temperature, light, . . . ). The sensor 160B may further be equipped with its own processor 610, memory 620 and I/O (input-output) 630, as well as wireless communication capabilities.

Figure 2B:
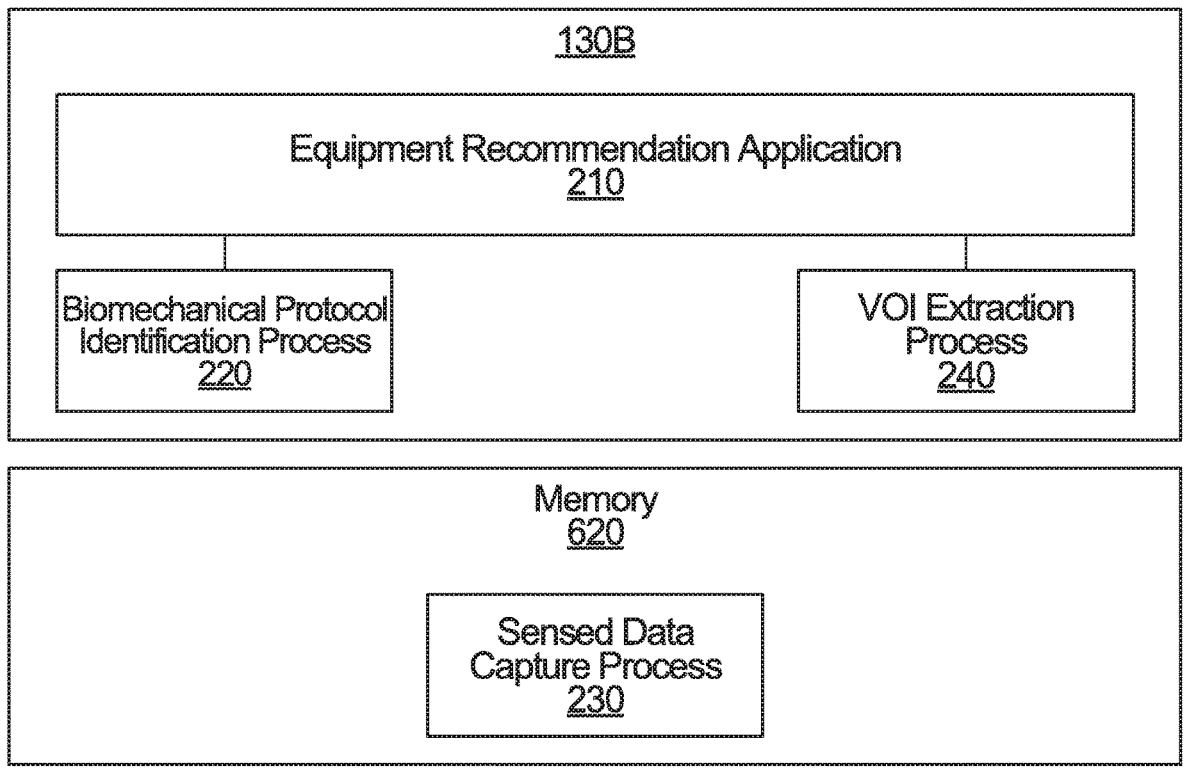

Thus, for the implementation of FIG. 1B, reference is made to FIG. 2B, which conceptually represents certain ones of the above mentioned processes being executed by the system processor 160B of the computing device 110B and other ones of the above processes being executed by a processor 610 of the sensor. Specifically, the system memory 130B is seen to include computer-readable instructions corresponding to the equipment recommendation application 210, the biomechanical protocol identification process 220 (which is optional) and the VOI extraction process 240, whereas the memory 620 of the sensor 160B is seen to include computer-readable instructions corresponding to the sensed data capture process 230.

Equipment Recommendation Application

Figure 3A:
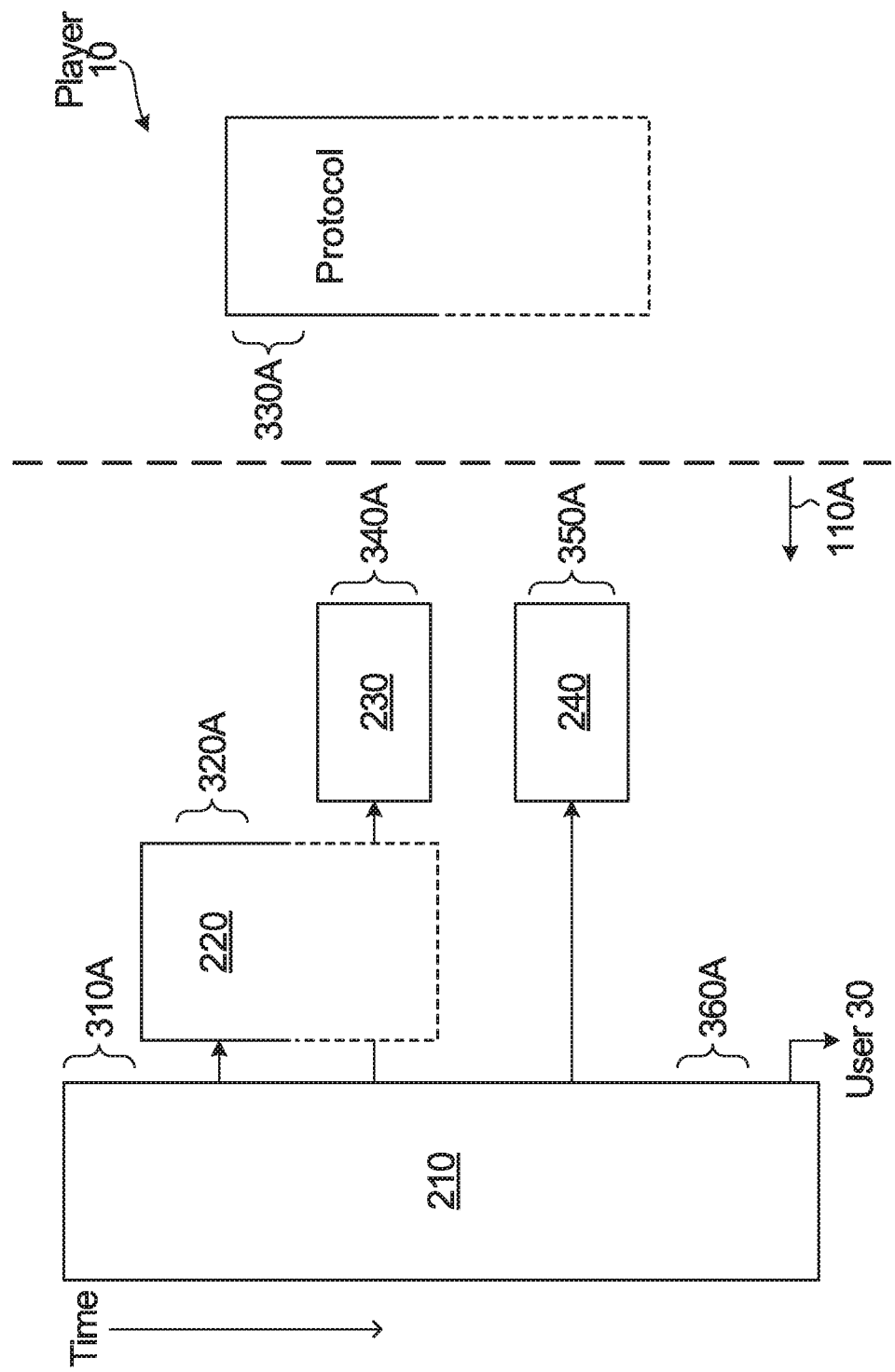
FIGS. 3A and 3B are timelines illustrating the relative order in which various processes are executed relative to execution by a subject of a biomechanical protocol, in accordance with a non-limiting embodiment

The equipment recommendation application 210 can be considered a main application from which the other processes 220, 230, 240 are subtending. Reference is now made to FIG. 3A, which is an example flow diagram conceptually illustrating various steps in the interaction among the aforementioned processes, over time (vertical axis), for the implementation of FIG. 1A. It is recalled that in this example, the equipment class is a hockey stick, the biomechanical protocol is a shooting protocol and the various processes are all executed by the system processor 120A. There are various phases 310A, 320A, 330A, 340A, 350A, 360A, 370A in the interaction among the aforementioned processes, as now described in further detail.

At or during phase 310A, the system processor is triggered to execute the computer-readable instructions associated with the equipment recommendation application 210. At or during phase 320A, as part of executing the computer-readable instructions associated with the equipment recommendation application 210, the system processor 120A calls the biomechanical protocol identification process 220 to identify the shooting protocol. At or during phase 330A, the player 10 begins executing the identified shooting protocol, which may be done autonomously or in response to a signal issued by the equipment recommendation system 100A. At or during phase 340A, as part of executing the computer-readable instructions associated with the equipment recommendation application 210, the system processor 120A calls the sensed data capture process 230 to capture sensed data. During this time, the player 10 is presumed to be executing the shooting protocol. At or during phase 350A, as part of executing the computer-readable instructions associated with the equipment recommendation application 210, the system processor 120A calls the VOI extraction process 240 to obtain values for certain VOIs from the sensed data (referred to as "extracted VOI values"). At or during phase 360A, as part of executing the computer-readable instructions associated with the equipment recommendation application 210, the system processor 120A processes the extracted VOI values in conjunction with reference data and identifies one or more recommended features of a hockey stick. At or during phase 370A, as part of executing the computer-readable instructions associated with the equipment recommendation application 210, the system processor 120A delivers a final recommendation for a hockey stick to the user 30.

Figure 3B:
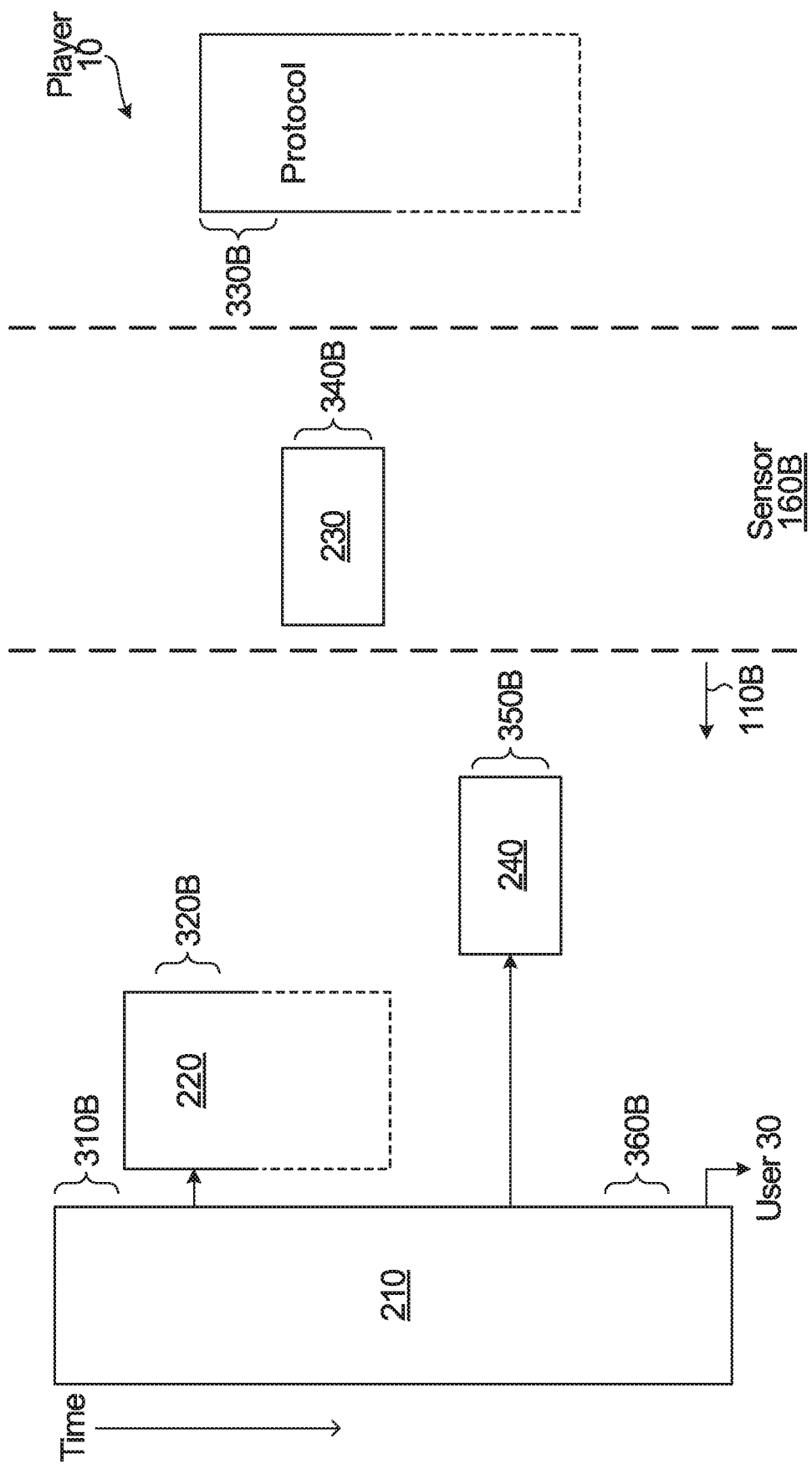

A similar flow diagram for the implementation of the equipment recommendation system 100B is shown in FIG. 3B, including a plurality of phases 310B, 320B, 330B, 340B, 350B, 360B, 370B. In this case, some of the processes are executed by the system processor 120B and other ones of the processes are executed by the processor 620 of the sensor 160B. At or during phase 310B, the system processor 120B is triggered to execute the computer-readable instructions associated with the equipment recommendation application 210. At or during phase 320B, as part of executing the computer-readable instructions associated with the equipment recommendation application 210, the system processor 120B calls the biomechanical protocol identification process 220 to identify the shooting protocol. At or during phase 330B, the player 10 begins executing the shooting protocol. At or during phase 340B, the processor 620 of the sensor 160B is triggered to execute the computer-readable instructions associated with the sensed data capture process 230. In this implementation, as part of executing the computer-readable instructions associated with the sensed data capture process 230, the processor 620 of the sensor 160B causes the transmission of sensed data to the computing device 110B. During this time, the player 10 is assumed to be executing the shooting protocol. At or during phase 350B, as part of executing the computer-readable instructions associated with the equipment recommendation application 210, the system processor 120B (in the computing device 110B) calls the VOI extraction process 240 to extract values of certain VOIs from the sensed data. This can be done in response to receipt of the sensed data from the external sensor 160B. At or during phase 360B, as part of executing the computer-readable instructions associated with the equipment recommendation application 210, the system processor 120B processes the extracted VOI values in conjunction with reference data and identifies one or more recommended features of a hockey stick. At or during phase 370B, as part of executing the computer-readable instructions associated with the equipment recommendation application 210, the system processor 120B delivers a hockey stick recommendation to the user 30.

Actions occurring at or during the aforementioned phases are now explained in greater detail. Where both implementations have a similar description, reference will be made to similar components in each implementation.

Phase 310A/310B

The system processor 120A/120B is triggered to execute the computer-readable instructions associated with the equipment recommendation application 210. This may be done by the user 30 of the communication device 110A/110B selecting an icon from a graphical menu, each icon corresponding to an app downloaded to the communication device 110A/110B. When executing the equipment recommendation application, the system processor 120A/120B creates and maintains an equipment recommendation session for the user 30, which could include guiding the user through various functions, such as entering information about the player 10, entering information about the user 30, setting up a profile for the player 10 and/or the user 30, managing execution of a shooting protocol and obtaining an equipment recommendation for the player 10.

Figure 4A:
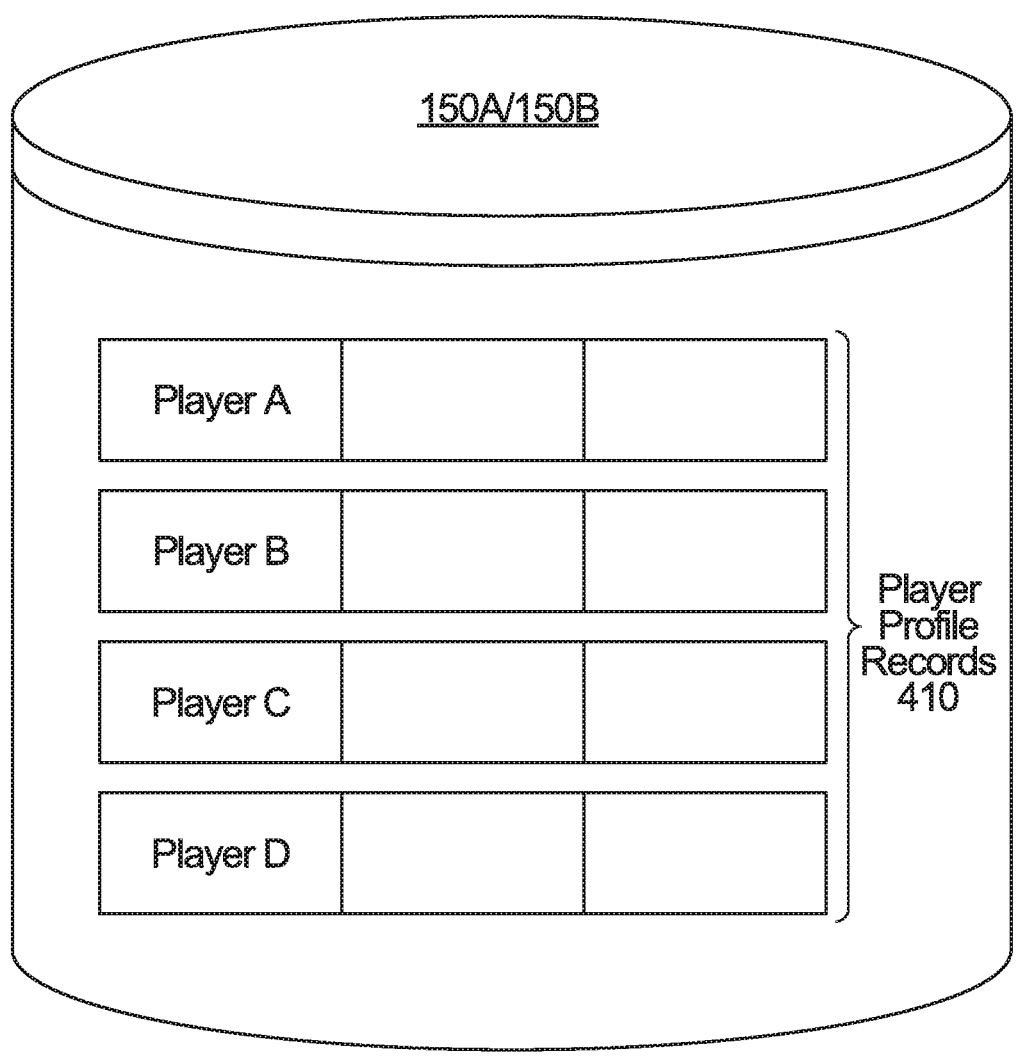
FIGS. 4A-4D shows possible contents of a database including player profile records, shooting protocol records and equipment records, in accordance with a non-limiting embodiment.

Indeed, as part of executing the computer-readable instructions associated with the equipment recommendation application 210, and with reference to FIG. 4A, the system processor 120A/120B may allow the user 30 of the computing device 110A/110B to enter certain input variables that may be stored in the database 150A/150B, e.g., as a player profile record 410 for the player 10. Examples of such input variables forming the player profile record 410 may include the following:

the player's name and contact information;
the player's age, height, weight and gender;
whether the player is naturally left-handed or right-handed;
the player's experience level (e.g., beginner, college, pro);
the budget for the item of equipment;
desired stick length; and/or
grip strength (known or measured).

Entry of the aforementioned input variables may be free-form, or may be selected from a list of possible values or ranges (provided by execution of the equipment recommendation application 210) to ensure data validity. In some embodiments, some or all of the aforementioned information may be provided by the user 30 of the computing device 110A/110B yet only held in the system memory 130A/130B for the duration of the recommendation session and not stored for use after the recommendation session.

Phase 320A/320B

As part of executing the computer-readable instructions associated with the equipment recommendation application 210, the system processor 120A/120B calls the biomechanical protocol identification process 220 in order to acquire the identity of a user-selected shooting protocol. This step may be optional, for example in the event that a single default shooting protocol is used.

A shooting protocol can be characterized by an expected shooting technique carried out by the player 10. For example, a slap shot shooting protocol involves grasping the hockey stick with both hands in a forehand grip, swinging the stick backwards so that the blade reaches an apex swinging the stick forward such that contact is made with the puck at a point near the minimum point of the downswing, and then carrying through while holding the stick with both hands. These technical elements are common to all slap shots and therefore can be associated with a slap shot shooting protocol. Analogously, biomechanical protocols may be defined for a wrist shot, slap shot, backhand shot, etc.

In addition to being characterized by a shot type (e.g., wrist shot, slap shot, snap shot, backhand, etc.) that the player 10 is expected to take, a shooting protocol may be characterized by other parameters. For example, whereas in some embodiments a single shot may suffice to gather sufficient data to make a meaningful recommendation, in other cases a plurality shots are needed, and thus the shooting protocol may be characterized by the number of times that the shot is expected to be taken in succession. Also, depending on whether the player 10 is an adult professional hockey player or an amateur player at the pee-wee level, for example, the shooting protocol may differ. The shooting protocol may further be characterized by a type of sensor (e.g., camera, inertial motion sensor, etc.) that is expected to be used. In the case where the sensor includes a camera (e.g., sensor 160A), the shooting protocol may specify the expected placement of the player 10 relative to the camera (including both the distance from the camera and the relative orientation so that the view from the camera is left sagittal, right sagittal, frontal, rear, etc.). In the case where the sensor includes inertial motion sensors built into a pair of gloves (e.g., sensor 160B), the shooting protocol may be further characterized by an expectation that the player 10 is wearing such gloves 40. Also, in the context of ice hockey, the shooting protocol may be characterized by whether the player 10 is expected to be wearing skates or if the shooting protocol is expected to take place on a non-slip surface. The shooting protocol may also be characterized by the equipment class of the item of equipment to be recommended (e.g., hockey stick).

Figure 4B:
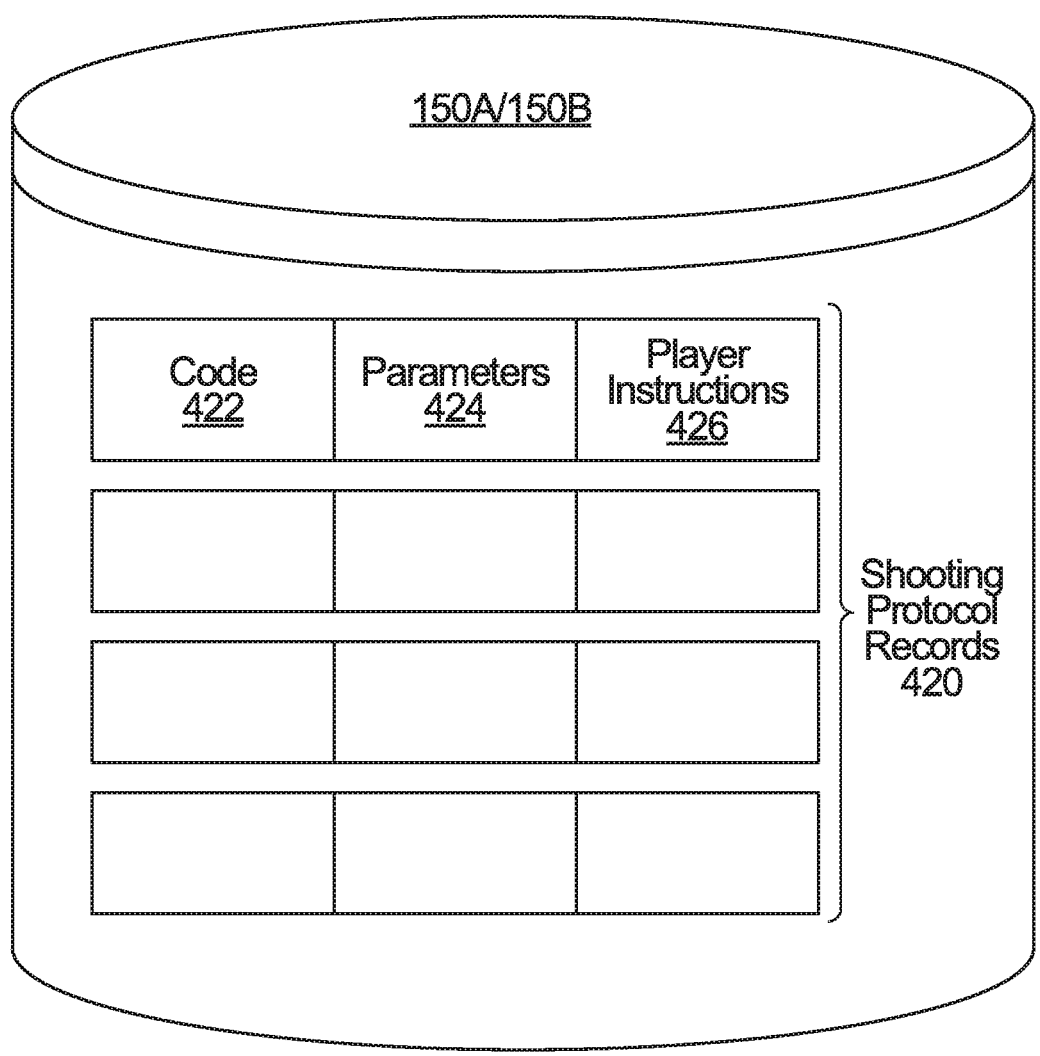

Clearly, due to the number of possible variables, there may be multiple shooting protocols, even for a single equipment class such as a hockey stick. The information pertaining to various shooting protocols may be stored as shooting protocol records in a shooting protocol bank. For example, FIG. 4B shows several shooting protocol records 420 stored in a shooting protocol bank in the database 150A/150B.

In a non-limiting embodiment, the player 10 is instructed to execute the selected shooting protocol. Depending on its nature, each shooting protocol may be associated with a different set of "instructions" to be followed by the player 10. As such, each of the shooting protocol records 420 may include a code 422 that identifies the corresponding shooting protocol, one or more fields 424 that characterize the corresponding shooting protocol (i.e., "shooting protocol parameters") and a set of "player instructions" 426 pertaining to the corresponding shooting protocol.

As part of executing the computer-readable instructions associated with the biomechanical protocol identification process 220, the system processor 120A/120B may allow the user 30 of the computing device 110A/110B to select a shooting protocol from the shooting protocol bank. Specifically, execution of the computer-readable instructions corresponding to the biomechanical protocol identification process 220 allows the user 30 of the computing device 110A/110B to enter certain information (e.g., via graphical user interface) that characterizes a particular one of the shooting protocols; the corresponding shooting protocol can then be found by comparison of the information in the fields 424 of each of the shooting protocol records 420. Alternatively or in addition, certain information in the player profile record 410 (e.g., age, experience level) may be used by the biomechanical selection process 220 to narrow down the set of possible shooting protocols from which the user 30 will be allowed to choose. This results in identification of one of the shooting protocol records 420 and retrieval of the corresponding player instructions pertaining to the identified shooting protocol.

The player instructions associated with the identified shooting protocol may then be conveyed to the player 10 who then may carry out the instructions and, in so doing, execute the identified shooting protocol. The manner in which the player instructions are conveyed to the player 10 could be through the playback of audio or video, or the display of images or descriptive text, for example, a player could be instructed to "perform three consecutive wrist shots followed by three consecutives slap shots".

In a variant, the player 10 is not instructed to specifically execute a particular shooting protocol, but rather the player 10 happens to execute the shooting protocol in the course of live play (e.g., during a practice or a game). In this case of spontaneous rather than mandated execution of the shooting protocol, the timing of execution of the shooting protocol is unpredictable and execution of the biomechanical protocol identification process 220 may involve executing a pattern recognition application that continuously monitors images of gameplay and recognizes when the player 10 has executed a shooting protocol. In some cases, identification of the shooting protocol may be done by processing data, and may even involve processing some of the data gathered by the sensors 160A/160B and used by the VOI extraction process 240. As such, execution of the biomechanical protocol identification process 220 may occur in real-time during execution of the biomechanical protocol that is being identified, it may occur later in time (i.e., after the sensed data has been received by the computing device 110A/110B). When the sensors 160A/160B include a camera, this exemplifies a subject (e.g., player 10) executing a hockey shot of a given type (such as a slap shot or a wrist shot), and the camera being configured to produce images representative of execution of such hockey shot by the subject.

Phase 330A/330B

During this phase, the player 10 executes the identified shooting protocol. In one non-limiting embodiment, this is done as the player 10 carries out the instructions conveyed to him/her, e.g., via the computing device 110A/110B. To this end, in an embodiment where the player 10 is instructed to execute an identified shooting protocol, the player 10 may follow the information contained in the player instructions associated with the identified shooting protocol. It is possible that as part of executing the computer-readable instructions associated with the equipment recommendation application 210, the system processor 120A/120B causes a signal to be output to instruct the player 10 to pay attention to the instructions and/or begin carrying out the identified shooting protocol.

In a variant, execution of the shooting protocol by the player 10 occurs without any prompting or control by the equipment recommendation system 100A/100B. For example, this may occur during a game. Thus, contrary to the above case where the shooting protocol is selected and then executed, identification of the shooting protocol follows or is contemporaneous with its execution. As such, a pattern recognition application may be required to determine that a shooting protocol is being executed and to identify it.

The shooting protocol may occur in various physical environments, including on the ice (at an arena or outside) during a game or practice, at a store, in a gym or even at the player's residence of place of work. Since the shooting protocol may in some cases be executed without holding an actual hockey stick, this may considerably increase the range of usefulness of the equipment recommendation system, allowing widespread applicability.

Phase 340A/340B

This corresponds to triggering execution of the sensed data capture process 230 and two non-limiting implementations are now described, with others being possible. In the first implementation (FIGS. 1A, 2A, 3A), which may correspond to the scenario where the sensor 160A is a camera embedded within the computing device 110A such as a smartphone, the sensed data capture process 230 executes within the system processor 120A of the computing device 110A. The embedded camera may capture multiple image frames per second (fps), e.g., 24, 30, 60 or up to 1000 fps or more, depending on operational requirements. Other values of the frame rate are of course possible. The captured images may then be stored in the system memory 130A for future retrieval and use. It is expected that the images feature the player 10 carrying out the shooting protocol although, as described elsewhere in this document, in certain variants it is conceivable that it would not yet be known that the shooting protocol is being executed, as this might only be revealed once at least some of the sensed data is processed.

In the second implementation (FIGS. 1B, 2B, 3B), the sensed data capture process 230 executes within the processor 620 of the sensor 160B which can be, for example, an external camera or an inertial motion sensor embedded within equipment 40 donned by the player 10. As already described, such equipment may be worn on areas of the body where the sensed data is expected to provide meaningful insight into the technique of the player 10. Examples of such equipment can include one or both gloves 40, one or both shoulder pads, one or both skates and the helmet to name a few non-limiting examples. The sensor 160B may also be included on the puck or boards, for example. Execution of the sensed data capture process 230 by the processor 620 of the sensor 160B may be triggered by receipt of a start signal provided by the player 10. Alternatively, execution of the sensed data capture process 230 by the process processor 620 of the sensor 160B may be triggered by "waking up" from sleep mode in response to detection of a change in condition (e.g., a sudden change in acceleration or detection of motion in a camera's field of view).

Still continuing with this second implementation, as part of executing the computer-readable instructions associated with the sensed data capture process 230, the processor 620 of the sensor 160B causes the transmission of sensed data to the computing device 110B. This transmission can take place over the wireless link 60. Specifically, the processor 620 of the sensor 160B may capture sensed data and transmit packets to the computing device 110B, whereby the packets contain the sensed data. The packets may be transmitted over the wireless link 60 via the I/O 630 using a protocol such as WiFi or Bluetooth, for example. In other embodiments, the sensed data may be transmitted inside packets over a wireline, Ethernet, fiber optic or free space optical link. In still other embodiments of the second implementation, the sensed data may be stored in the memory 630 of the sensor 160B and then uploaded onto the computing device 110B at a later time (e.g., after the shooting protocol).

Where the sensor 160A/160B is a camera, the above exemplifies a subject executing a hockey shot of a given type (such as a slap shot or a wrist shot), and the camera being configured to produce images representative of execution by the subject of such hockey shot.

Although it is possible for the data provided to the system processor 120A/120B to be raw data (e.g., captured images or sensor output), it is also possible for the provided data to be a filtered version of the raw data. Filtering may be achieved using various digital and/or analog filtering techniques (such as low-pass, Butterworth and/or Hammond filters, for example). Also, the sensed data may be streamed or transmitted in absolute or in differential form. Furthermore, metadata (or processed data) such as sensor ID, maximum and minimum values, and duration of the shooting protocol, may be transmitted by the sensor 160B.

Phase 350A/350B

As part of executing the computer-readable instructions associated with the equipment recommendation application 210, the system processor 120A/120B may call the VOI extraction process 240 to extract values of certain variables of interest (VOIs) from the captured sensed data. The VOIs may also be referred to as "key performance indicators", "technique characterizers" or "parameters". Extraction of the values for certain VOIs may occur after the subject (player 10) has finished executing the shooting protocol (i.e., the captured sensed data is retrieved from the system memory 130A/130B) or while the shooting protocol is still ongoing (i.e., the captured sensed data is live streaming). This latter implementation is feasible in cases where the system processor 120A/120B is sufficiently fast to carry out real-time (or quasi-real-time) processing and analysis.

In executing the VOI extraction process 240, the system processor 120A/120B analyzes the sensed data in accordance with an algorithm that may depend on (i) the identified shooting protocol (or, equivalently, the shooting protocol parameters that characterize the identified shooting protocol) and (ii) information in the player profile record 410 for the player 10 (e.g., height, arm span, gender, weight, etc.). In one embodiment, an output of the VOI extraction process 240 may be a set of extracted VOI values that characterize the player's rendition of the shooting protocol. The set of extracted VOI values may be stored in the system memory 130A/130B in association with the equipment recommendation session and for further use as will be described later elsewhere in this document.

It should be appreciated that the sensed data may include data received from more than one sensor (i.e., multiple time series) and therefore execution of the VOI extraction process 240 may involve performing the appropriate sensor identification for each time series. This may be performed based on the previously described sensor ID that may be transmitted by each sensor. Also, when amalgamating the sensed data from multiple sensors, execution of the VOI extraction process 240 may involve performing time alignment of the multiple time series, including trimming certain portions of certain time series lacking significant data.

Generally speaking, the steps in the VOI extraction process 240 may include:
Time series data acquisition;
  This time series data will be recorded, stored and used as the basis for the VOI extraction process 240.
Pre-detection (automatic trigger starting or stopping);
  Detection modules, which can be encoded as computer-readable instructions executed by a processor, allow for automatic shot event detection such as ice contact or puck contact. These specific events can be used to 1) align the different data sources during the sensor data combination (e.g., when data from a sensor is to be aligned with data from a camera) and 2) clip and trim the data to avoid filling the memory with unnecessary data. Thus, for example, an automatic shot event detection module may be configured to detect puck contact at time X. That could mean that the images to be committed to memory are those that occurred from time X-Y milliseconds until X+Z milliseconds, where Y and Z can be user-defined. Consequently, this allows memory to be economized, so that images occurring before time X-Y are not needlessly saved (e.g., back to a period before the player even began preparing for the shot).
Sensor clock synchronization;
  This ensures the proper alignment of the different data sources.
Sensor data combination;
  This combines data from the different sensors and/or sources into one single structured array.
Raw signal filtering;
  Removes unwanted noise and out-of-spectrum signals from raw measured signals.
Shot index identification;
  Identification of all the different important shot events in the time series (index). Examples of shot events could include ice contact and puck contact, to name a few non-limiting possibilities.
Extraction of filtered signal values and indexing at shot events;
  Extraction of all variables at the shot events identified in the previous step.
Calculation of velocities and displacements from sensed raw signals;
  Calculation of estimated movement linear velocities, displacement, angular displacement, and angular acceleration.
Extraction of VOI values.

Figure 7:
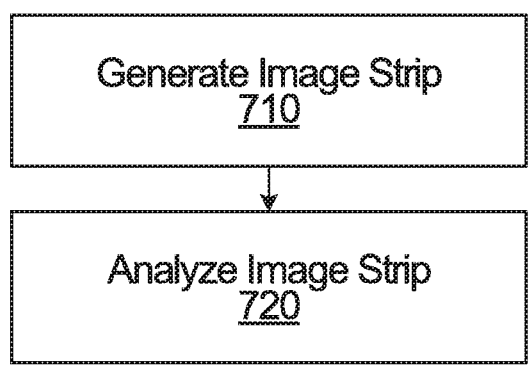
FIG. 7 is a flowchart illustrating some steps in a VOI extraction process, in accordance with a non-limiting embodiment.
Figure 8A:
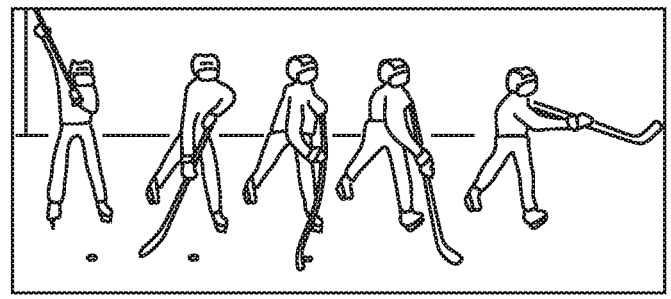
FIGS. 8A and 8B are image strips that can be processed by a VOI extraction process, in accordance with a non-limiting embodiment.
Figure 8B:
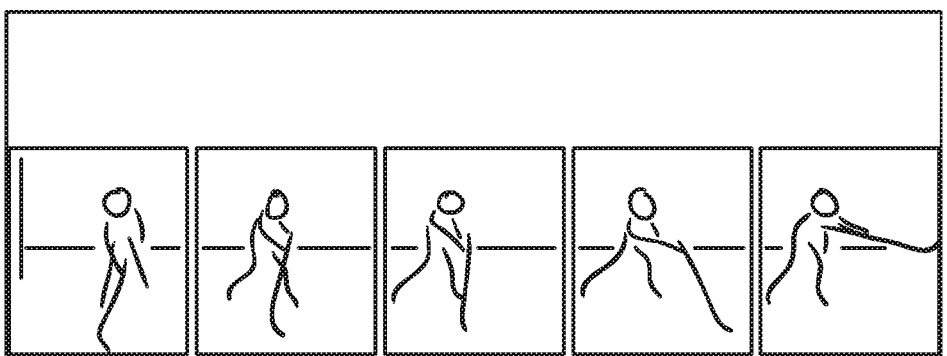

Consider the case where the sensor 160A/160B is a camera that creates a sequence of image frames. As shown in FIG. 7, the algorithm carried out as part of the VOI extraction process 240 may involve a step 710, in which an image strip is generated (and stored in the system memory 130A/130B), and step 720, in which the image strip is analyzed. With reference to FIGS. 8A and 8B, image strips are shown to include a selected subset of images from among a greater plurality of captured images. The subset may be selected at step 710 in different ways. For example, the selected subset may be created by identifying those captured images in which the position of the player 10 or the stick 20, as captured by the camera, most closely matches (or registers with) certain a pre-defined position that is one of the shooting protocol parameters associated with the identified shooting protocol (e.g., when the stick blade is at its apex). Multiple such pre-defined positions may be defined, resulting in multiple images forming part of the image strip. Then, in the second step of the VOI extraction process 240, the images in the image strip are analyzed for features such as:
  the distance between the hands on the stick at the minimum point of travel of the stick;
  the player's stance at puck release and whether the player is leaning forward, backward or is stable;

the maximum, minimum or average distance between the hands and the edges of the stick at any time;

the shortest distance from the stick blade to the ground when the blade is at its apex when taking a swing;

the angle of the stick at its apex;

the speed/angular velocity of the stick 20 when contacting the puck, etc.

Consider also the case where the sensor 160A/160B is an inertial motion sensor mounted on the two gloves 40 of the player. Consider that the sensed data includes samples of each glove's curved/quasi-circular trajectory through three-dimensional (3D) space during execution of the identified shooting protocol by the player. Execution of the VOI extraction process 240 may involve determining the values of certain key features of the sensors' "coordination pattern", such as:

their nearest and furthest points from one another in space;

the angle of motion covered by the two sensors while remaining equidistant (which would infer that the stick was being held);

the respective radii of the trajectories covered by each sensor;

the angular velocity of each sensor, etc.

Other non-limiting examples of VOIs that yield extracted VOI values may include:

Hand Variables:
  Timing between hands velocity peaks (max and min indexes offsets in ms between top and bottom hand)
  Delta hand velocity (Delta=Max−Min)
  Timing between hands acceleration profiles (max and min indexes offsets in ms between top and bottom hand)
  Delta hand acceleration (Delta=Max−Min)
  Timing between hands velocity peaks and puck velocity peaks
Puck variables:
  Puck linear velocity (max, min, delta)
  Puck Acceleration (max, min, delta)
  Puck spin (flat vs off-axis) (delta from all 3 gyro axes)
  Stick/Puck contact time based on puck acceleration profiles
Stick Variables:
  Stick overall angular displacement
  Stick acceleration (max, min, delta) and indexes of each (moment in time)
  Stick velocity (max, min, delta) and indexes of each (moment in time)
Timing Variables:
  Timing between hands and stick acceleration profiles (max and min indexes offsets in ms between selected hand and stick)
  Timing between hands and stick velocity profiles (max and min indexes offsets in ms between selected hand and stick)
  Timing between hands, puck and stick acceleration profiles (max and min indexes offsets in ms between selected hand, stick and puck)
  Timing between hands, puck and stick velocity profiles (max and min indexes offsets in ms between selected hand, stick and puck)

As such, it should be appreciated that the extracted VOI values may be expressed as coordinate pairs (K;V), where K refers to an extracted feature (or VOI) and V refers to the value of that feature.

It will also be appreciated that the set of extracted VOI values that can be obtained by the VOI extraction process 240 may be different for different types of sensors and different shooting protocols.

Also, in the course of executing the VOI extraction process 240, the system processor 120A/120B may execute certain preliminary functions that allow greater accuracy in the extraction of VOI values, such as, for example, detecting whether the player is left-handed or right handed, or detecting the length of the stick. In this way, the VOI extraction process 240 may also be used to complete the input variables in the player profile record 410 for the player 10.

As mentioned earlier, the set of extracted VOI values may be stored in the system memory 130A/130B in association with the equipment recommendation session and for further use. It should be understood that a plurality of sets of extracted VOI values may be output by the VOI extraction process 240 in the case where the player 10 carries out multiple trials of the shooting protocol. Alternatively, it is envisaged that when there are such multiple trials, only an average extracted VOI value (e.g., mean, median or mode) could be preserved for each VOI.

It is also envisaged that additional information may be stored in the system memory 130A/130B in association with the equipment recommendation session, including certain information about the shooting protocol that was the source of the analyzed information, in order to assist in later comparisons. Thus, the information stored in the system memory 130A/130B in association with the equipment recommendation session may include not only the coordinate pairs (K;V) for multiple VOIs but also a variable that indicates the shooting protocol record 420 of the identified shooting protocol, or the corresponding shooting protocol parameters.

In another embodiment, rather than be obtained by computer processing, certain extracted VOI values may obtained from interaction with the end user based on observable technique differentiators of the player 10 that can be assessed by the end user. In such an embodiment, the system processor 120A/120B may carry out a questionnaire GUI with multiple-choice answers that are to be filled out based on observable visual cues that are present in the image strips. Examples of VOIs for which values (selected from a multiple-choice list) are obtained through observation rather than (or in addition to) computer processing may include:

Wrist Shot variables:
  Shooting style
    Sweep-Sweep and Snap-Snap
  Main segment that initiates the shot
    Shoulders-Trunk-Hips
  Loading stance
    Front Foot-Centered-Back Foot
  Location of puck at contact relative to base of support
    Front foot-Centered-Centered with blade opened
  o Shoulder and trunk position relative to the shooting direction
    Closed-Centered-Opened
  Upper arm dynamics
    Pull back-Swing back-Supporting
  Stance at puck release
    Front Support-Stable-Stance shift
  Main segment for energy generation
    Shoulders-Trunk-Hips
Slap Shot:
  Location of ice contact relative to the base of support
    Front Support-Centered-Back Support
  Location of puck at contact relative to base of support Front foot-Knee-Centered
Position of the bottom hand relative to the front foot at contact
Past front foot-Front foot-Before front foot
Upper arm dynamics
Pull back-Swing back-Supporting
Stance at puck release
Front Support-Stable-Stance shift
Phase 360A/360B

As part of executing the computer-readable instructions associated with the equipment recommendation application 210, the system processor 120A/120B generally (i) determines one or more "recommended features" based at least in part on the extracted VOIs (performance indicators or parameters) and (ii) compares the recommended features with predefined sets of features that characterize respective variants of the item of equipment, in this case a hockey stick. This leads to at least one of the variants being identified, such as a particular model of hockey stick having a particular blade pattern and a particular resistance to flex.

Figure 9:
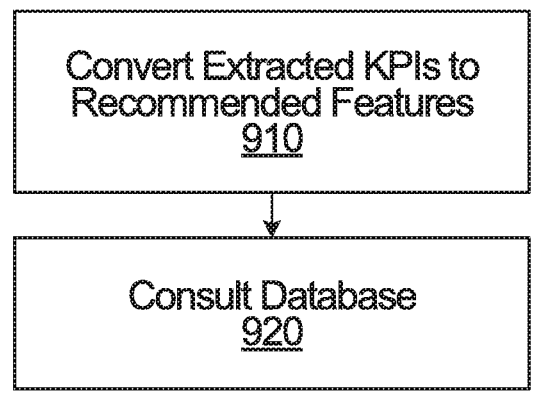
FIG. 9 is a flowchart illustrating certain steps forming part of an equipment recommendation application, in accordance with a non-limiting embodiment.

With reference to FIG. 9, the system processor 120A/120B may convert the extracted VOI values into recommended features of a hockey stick (step 910) and then consult the database 150A/150B in an attempt to find one or more known hockey sticks (i.e., "variants") having features (which are in a predefined set) that match the recommended features (step 920). As will be seen below, this is one example of outputting a recommendation for a subject based on (i) parameters extracted from images representative of execution by the subject of a certain type of shot and (ii) the type of shot being executed (wrist shot, slap shot).

Figure 4C:
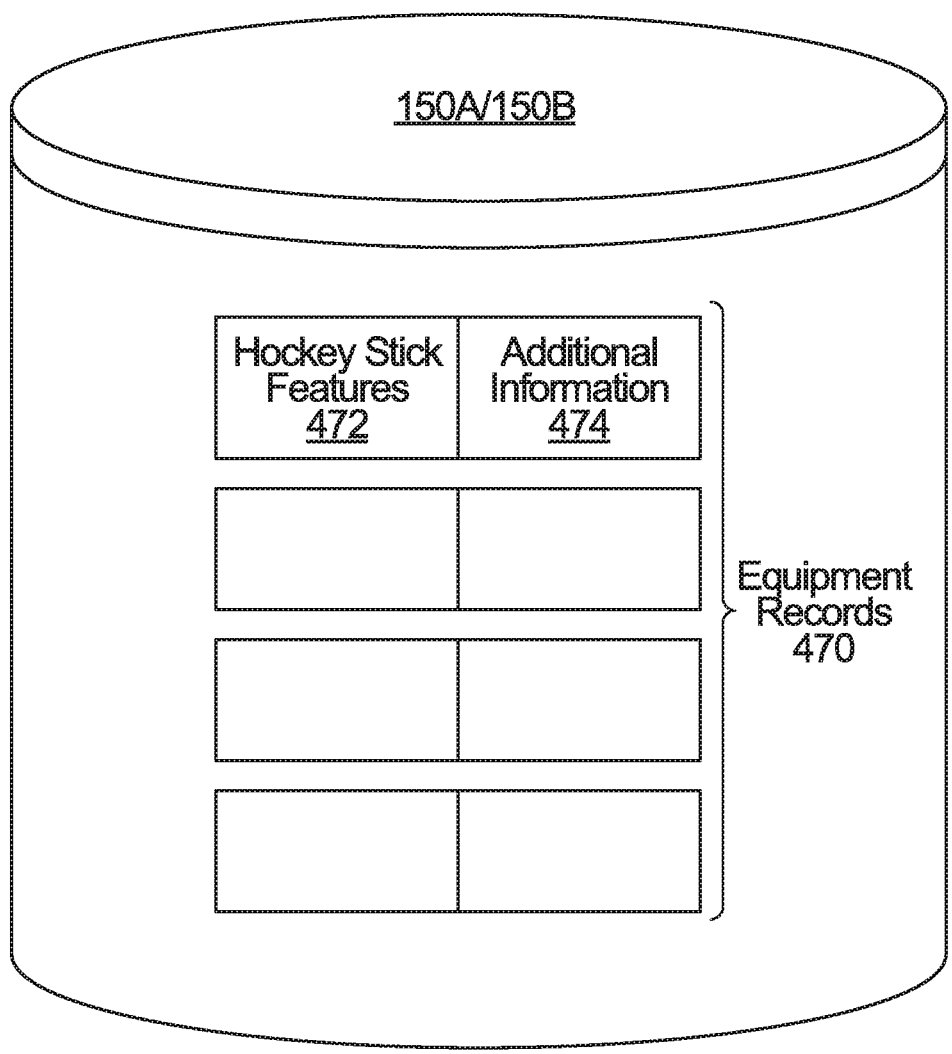

To this end, and with reference to FIG. 4C, the database 150A/150B may include a plurality of equipment records 470, each of which is associated with a known hockey stick ("variant") and includes a field 472 that stores features of that hockey stick. The features of a particular hockey stick may include measured values for one or more product properties such as:
shaft length;
shaft thickness;
weight;
flexibility/rigidity (e.g., resistance to flex, portion along shaft having greater flexibility than others, etc.);
blade pattern;
etc.

Each of the equipment records 470 may also include a field 474 which, for a particular hockey stick, stores additional information about the manufacturer, model and price of the particular hockey stick.

At step 910, the system processor 120A/120B converts the extracted VOI values into a set of features of a hockey stick which can be referred to as "recommended features". This may include processing the extracted VOI values with an algorithm to obtain specific values for one or more of the product properties given above. The manner of converting extracted VOI values into recommended features of a hockey stick (or into recommended values for one or more of the product properties) may be based on prior testing.

For example, and with reference to FIG. 5, if one of the VOIs is the distance between the hands on the stick at the minimum point of travel of the stick (represented by the extracted VOI value "D") and another one of the VOIs is the player's height (represented by the extracted VOI value "H"), then one of the ensuing product properties may be the shaft length. The recommended value of this product property, denoted $L^*$, may be computed as $L^* = A \times D + B \times H$ where A and B are empirically derived constants (or variables) obtained analytically or empirically.

Of course, it may be the case that it is not possible to derive recommended values for all product properties from the extracted VOI values.

At step 920, the system processor 120A/120B attempts to match the recommended features obtained at step 910 with the features of individual known hockey sticks as stored in field 472 of the equipment records 470. What is considered a "match" may vary depending on operational considerations. Those of the equipment records 470 found to "match" may be referred to as "candidate" equipment records.

For example, the "attempt to match" may involve computing a distance metric between the set of recommended features and the set of features in each of the equipment records 470. An objective function (e.g., minimizing a distance metric) can then be applied. In computing/minimizing the distance, known distance metrics and techniques can be used. The product properties can also be weighted by predetermined coefficients indicative of the relative importance of the respective product properties.

In another example, the product properties can be a prior attributed a certain importance and their values matched in that order of importance, i.e., sequentially. For example, if a shaft length is prioritized over shaft thickness, then it is envisaged to identify, in a first pass, those of the equipment records 470 whose shaft length (as found in field 472) matches (or is closest to) the recommended shaft length before making any comparisons of shaft thickness. In more complex matching schemes, the order of operations may be mapped out in a decision tree that encodes the relative priority of the various product properties to be compared, and may include conditional logic.

It should be appreciated that by relaxing the constraints to declare a match, it may be possible to constrain and require the equipment recommendation application 210 to identify at least one candidate equipment record.

Alternatively, where there is no match, the recommended features of the hockey stick may be utilized to create a customized hockey stick. This may allow the customization of hockey sticks providing improved performance tailored to individual players.

EXAMPLE

Conversion of Extracted VOI Values Into Flex

Figure 11:
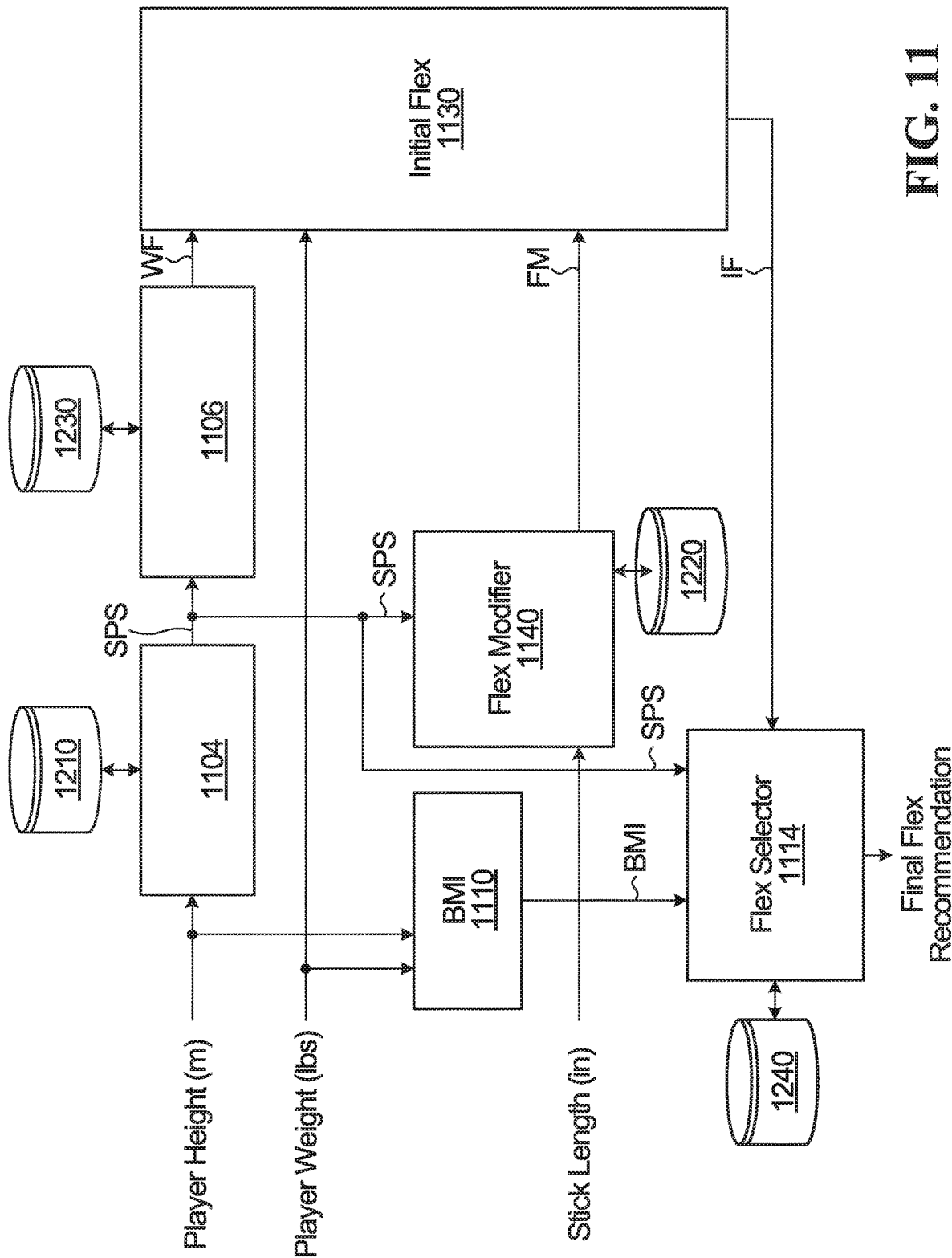
FIG. 11 is a diagram that characterizes the functionality of a flex definition process, in accordance with a non-limiting embodiment.

With reference to FIG. 11, there is shown an example diagram that may be used to characterize and describe a "flex definition process" for converting a plurality of extracted VOI values into a recommended feature, in this case a recommended flex value. The numerical value of the flex value may actually represent a "resistance to flex", which corresponds to the weight (e.g., in pounds) needed to bend the stick by a certain amount (e.g., 1 cm). As such, a higher flex value, and therefore a higher resistance to flex, means a stick that is more difficult to bend.

In this example, the VOIs that are input to the flex definition process (i.e., the "input VOIs") include player height, player weight, and stick length. Values for one or more of the input VOIs can be provided by the player (and entered into the player profile record 410) or determined by a separate process, e.g., based on video analysis of gameplay.

Figure 12:
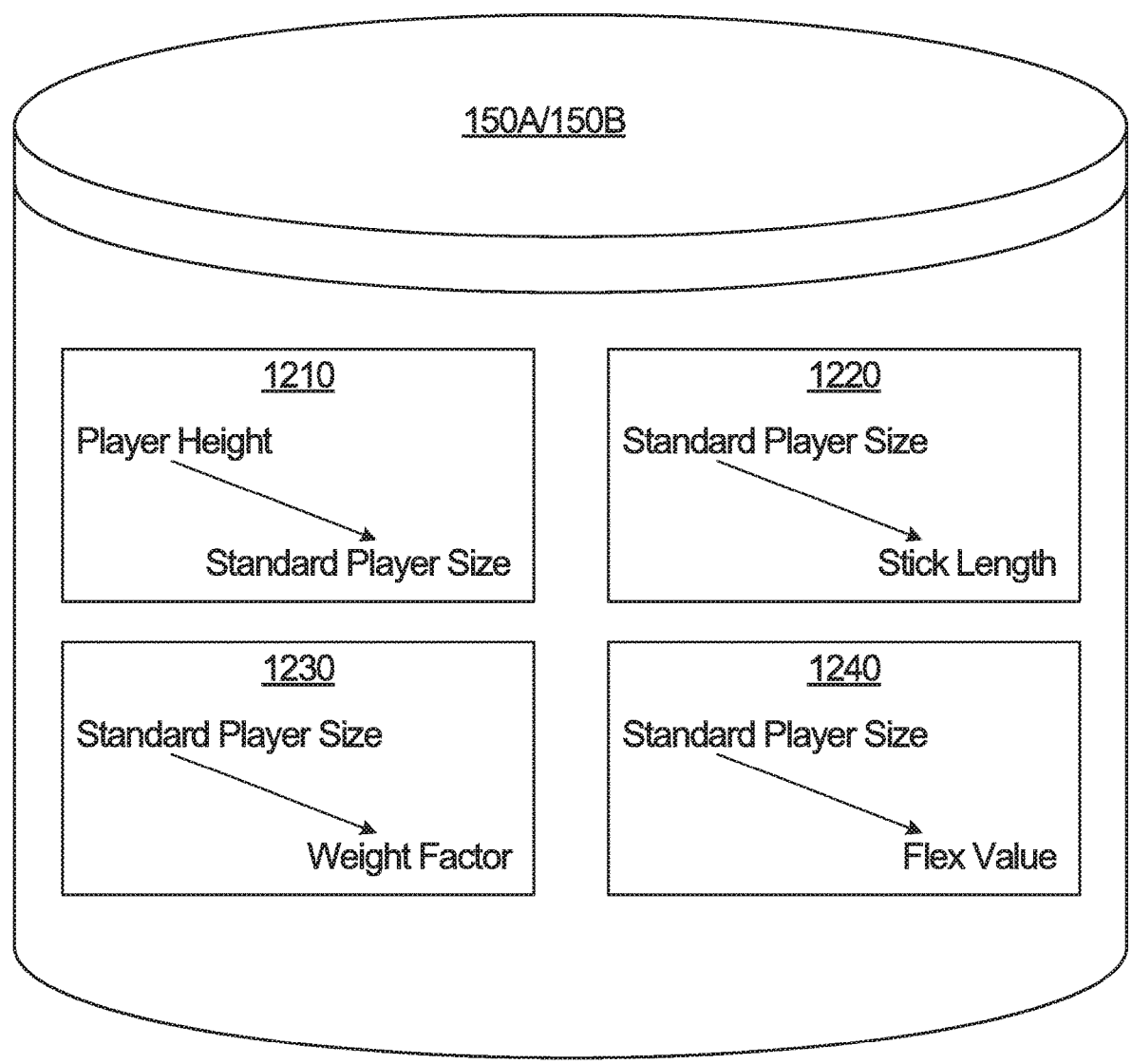
FIG. 12 illustrates various possible contents of a database that may be used by the flex definition process, in accordance with a non-limiting embodiment.

Also in this example, and with reference to FIG. 12, the database 150A/150B holds certain additional information (e.g., relationships stored in the form of data sets, such as look-up tables) that can be used in the flex definition process. For example:

- A "standard size definition" data set 1210 associates different standard player sizes with different ranges of player heights. The ranges may be empirically derived. Specifically, a player measuring less than 5' may be associated with a "junior" standard size, a player measuring between 5' and 5'8" may be associated with an "intermediate" standard size, and a player measuring over 5'8" may be associated with a "senior" standard size.
- A "standard stick length" data set 1220 associates different standard player sizes with different stick lengths. Specifically, a "junior" player bay be associated with a 50-inch standard stick length, an "intermediate" player may be associated with a 57-inch standard stick length, and a "senior" player may be associated with a 60-inch standard stick length.
- A "weight factor" data set 1230 associates different weight factors with different standard sizes. The weight factors may be empirically derived. Specifically, a junior player may be associated with a weight factor of 1.75, an intermediate player may be associated with a weight factor of 2.0 and a senior player may be associated with a weight factor of 2.3.
- A "standard flex options" data set 1240 associates different standard player sizes with different sets of flex values. The flex values may be empirically derived and they may be limited to available production values. Specifically, a junior player may be associated with flex values of 20, 30, 40 and 50, an intermediate player may be associated with flex values of 55 and 65, and a senior player may be associated with flex values of 70, 77, 87 and 102.

It should be appreciated that the above values and relationships are merely examples, and any suitable values or relationships may be used.

With reference to FIG. 11, various non-limiting examples of functional blocks in the flex definition process are illustrated. At block 1104, the player height is converted using the standard size definition data set 1210 into a standard player size SPS, which is provided to three other blocks. Firstly, the standard player size SPS is provided to block 1106, which uses the weight factor data set 1230 to map the standard player size SPS to a weight factor WF, and then the weight factor WF is provided to "initial flex" block 1130. Secondly, the standard player size SPS is provided to a "flex modifier" block 1140. Thirdly, the standard player size SPS is provided to a "flex selector" block 1114.

The flex modifier block 1140 receives the player stick length, which may be an input VOI or it may be computed through measurements obtained from still images or video. The flex modifier block 1140 also receives standard player size SPS from block 1104. The flex modifier block 1140 uses the standard stick length data set 1220 to convert the standard player size SPS into a standard stick length and then compares the standard stick length to the player stick length to produce a "flex modifier" FM, which is provided to the initial flex block 1130. For example, for every 2 inches that the player stick length is longer than the standard stick length, the flex modifier FM is increased by 8, and for every 2 inches that the player stick length is shorter than the standard stick length, the flex modifier is decreased by 8. Other ways of computing a flex modifier are of course possible.

As for the initial flex block 1130, it receives not only the weight factor WF from block 1106 and the flex modifier FM from flex modifier block 1140, but also the player weight (one of the input VOIs). From these inputs, the initial flex block 1130 produces an initial flex IF that is provided to flex selector block 1114. In particular, initial flex block 1130 first divides the player weight by the weight factor WF to produce a value which can be referred to as the preliminary flex. For example, a 200-lb player measuring 5'11" in height would be considered "senior" and therefore would have a weight factor of 2.3 and this would result in a preliminary flex of 87. In contrast, a 160-lb player who is 5'7" tall would be considered "intermediate" and therefore would have a weight factor of 2.0, which results in a preliminary flex of 80. Then, initial flex block 1130 adjusts the preliminary flex by the flex modifier FM obtained from flex modifier block 1140. The result is the initial flex IF which is provided to flex selector block 1114.

For its part, flex selector block 1114 receives the initial flex IF from initial flex block 1130, the standard player size SPS from block 1104, as well as a body mass index BMI from a body mass index block 1110. Body mass index block 1110 takes the player height and the player weight (which are input VOIs) to produce the body mass index BMI. This can be done, for example, by using a formula such as weight (in certain units, e.g., in kilos) divided by the square of the height (in certain units, e.g., in meters); of course other formulas are possible. Then, the flex selector outputs a recommended flex value based on the various inputs (namely, IF, SPS and BMI). This can be done in a variety of ways. For instance, it is envisaged that each of the various standard player sizes is associated with a set of pre-determined flex values. By way of non-limiting example, due to manufacturing constraints, sticks may be made to have a limited number of flex values. However, it may not be advisable to leave open the possibility of recommending any flex value to any player. For example, even though the initial flex for a certain senior player may point to a low flex value (e.g., in the 50-60 range), it may nevertheless be preferred to limit the flex to no less than, say, 70. This could be done for a variety of reasons, including providing better control of inventory and price.

As such, one role of flex selector block 1114 may be to take the initial flex IF and to constrain it to one of the standard flex values for the standard player size that is appropriate for the player in question. The mapping of standard player sizes to sets of standard flex values can be found in the "standard flex options" data set 1240. In a non-limiting example, a senior player may be provided with a recommended flex value constrained to a first set (e.g., one of 70, 77, 87 and 102), an intermediate player may be provided with a recommended flex value constrained to a second set (e.g., one of 55 and 65), and a junior player may be provided with a recommended flex value constrained to a third set (e.g., one of 20, 30, 40 and 50).

Another role of flex selector block 1114 may be to further take into account the body mass index BMI of the player in question, as received from the body mass index block 1110. For instance, if the body mass index for a given player indicates that the player is "big" (e.g., has a body mass index BMI greater than 28), yet the standard player size for that player is "intermediate" (and not senior), then the player may be provided with a recommended flex value constrained to a subset of one or more of the first, second and third sets (e.g., the subset of 70, 77 and 87, all more commonly associated with the "senior" standard player size). The rationale for this is to make sure that a seemingly "intermediate" size player is not being recommended a flex value that is too low considering the inherent power attributed to this player by virtue of his or her BMI; otherwise the player could easily overpower the stick based on his or her higher weight (and ultimately higher overall force). Of course, an even more extreme combination is possible, such as a BMI indicative of a "big" morphology with a standard player size corresponding to "junior" or, on the opposite end of the spectrum, a BMI indicative of a "thin" morphology (e.g., BMI less than 21) with a standard player size corresponding to "senior". This could require tweaking the recommendation to a lower flex value given the relatively low weight of the player who has been attributed a "senior" player size by virtue of being tall. Each of these special scenarios may in effect create a new "temporary" standard player size for the purposes of computing the flex value.

The outcome of the flex definition process is the recommended flex value which, in this example, would in the current non-limiting example is constrained to be one of 20, 30, 40, 50, 55, 65, 70, 77, 87 and 102.

Phase 370A/370B

Figure 10:
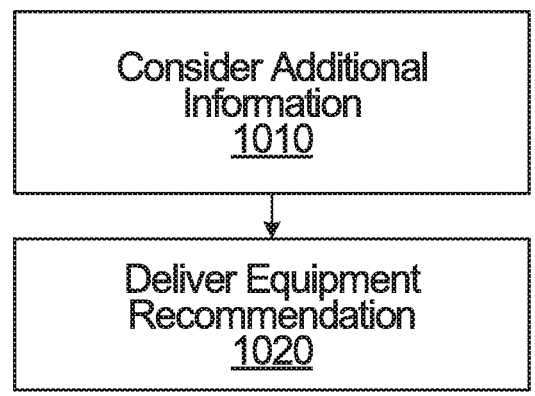
FIG. 10 is a flowchart illustrating certain other steps forming part of an equipment recommendation application, in accordance with a non-limiting embodiment.

As part of executing the computer-readable instructions associated with the equipment recommendation application 210, and with reference now to FIG. 10, the system processor 120A/120B (i) considers additional information to formulate an equipment recommendation from among the candidate equipment records identified at phase 360A/360B (step 1010); and (ii) delivers the equipment recommendation to the user 30 of the computing device 110A/110B (step 1020). If there is exactly one candidate equipment record for which a match has been declared at phase 360A/360B, then step 1020 may be executed without executing step 1010.

In particular, consider that N candidate equipment records may have been identified by the equipment recommendation application 210 as described above at phase 360A/360B, where N>1. At step 1010, certain factors may be processed by the system processor 120A/120B so as to result in a final number N* of candidate equipment records, where N* may be the same as or smaller than N. Possible examples of factors to consider may include information from the player profile record 410, such as the player's experience level (e.g., beginner, college, pro) and/or the budget for the hockey stick. It should be appreciated that certain other information from the player profile record 410 (e.g., height, gender, etc.) might already have been considered by the biomechanical protocol identification process 220 and/or the VOI extraction process 240.

For example, if three (3) candidate equipment records (corresponding to hockey stick models X, Y and Z) were found to be a match for the player 10 based on execution of the VOI extraction process 240 and steps 910 and 920, and if models X and Y are priced outside the budget, then consideration of the budget as a factor could eliminate models X and Y, leaving model Z as the hockey stick to be recommended.

In some cases, the final number N* of candidate equipment records may still be greater than 1. In other embodiments, this would not be acceptable, and in such cases execution of step 1010 might be configured so as to force the identification of a single candidate equipment record.

In still other cases, the final number N* of candidate equipment records may be zero, i.e., the constraints imposed by consideration of the additional factors were too severe. In such instances, the recommended features of the hockey stick may be utilized to create a customized hockey stick.

At step 1020, information indicative of a recommended hockey stick(s) (e.g., manufacturer and/or model and/or other characteristics such as blade pattern) may be identified to the user 30 of the computing device 110A/110B based on the information in field 474 of the remaining candidate equipment records (of which there may be one or more than one). In one example embodiment, the system processor 120A/120B may cause the information indicative of the recommended hockey stick(s) to be displayed on the screen 70 of the communication device 110A/110B. In another example embodiment, the system processor 120A/120B may save the information indicative of the recommended hockey stick(s) in the player profile record 410 and/or in a profile record associated with the user 30 (which may be stored in the database 150A/150B or elsewhere). In a further example embodiment, the system processor 120A/120B may cause the information indicative of the recommended hockey stick(s) to be sent via electronic means (e.g., email, text, etc.) to an online account (possibly including a shopping cart) associated with the user 30 and/or a vendor of hockey sticks.

Alternative Embodiment of Phase 360A/360B

As part of executing the computer-readable instructions associated with the equipment recommendation application 210, the system processor 120A/120B may consult a version of the database 150A/150B that has been pre-populated with baseline values for certain VOIs associated with known hockey sticks (i.e., "variants" of the item of equipment). These baseline VOI values may be obtained based on prior testing of the known hockey sticks, and the baseline VOI values obtained for a particular variant may form a combination of equipment features that characterize that variant. The baseline VOI values in the database 150A/150B can be updated based on feedback from equipment testing in order to improve performance of the equipment recommendation system when mapping extracted VOI values to baseline VOI values.

Figure 4D:
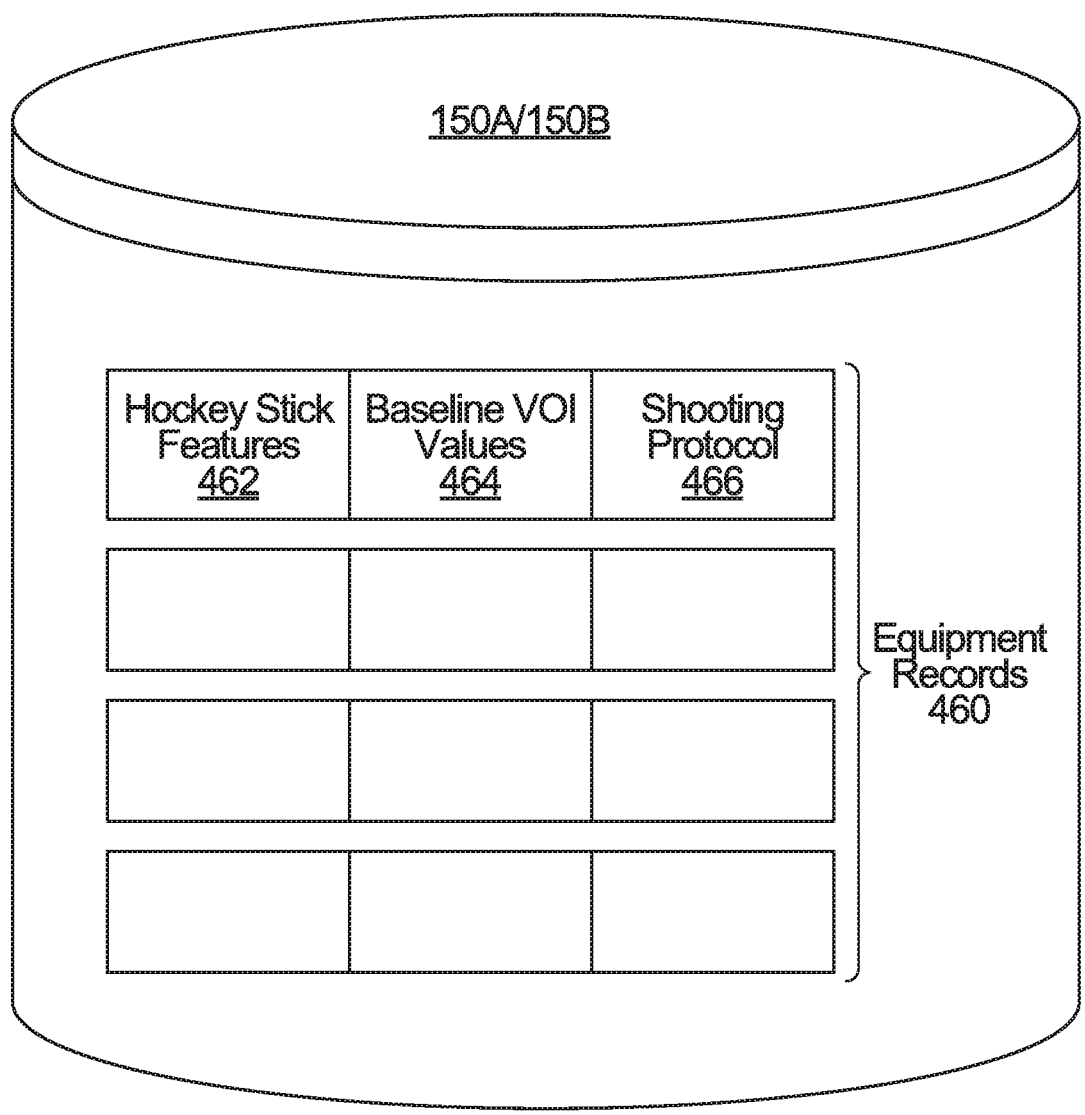

To this end, and with reference to FIG. 4D, the database 150A/150B may include a plurality of equipment records 460. Each of the equipment records 460 may include a field 462 that identifies features of a particular hockey stick variant, such as its make and model. Each of the equipment records 460 also include one or more fields 464 that are populated with baseline VOI values for certain VOIs associated with the corresponding variant (e.g., make and model) of hockey stick.

The baseline VOI values may be those that have been determined by a third party, e.g., a manufacturer, as being representative of that variant of hockey stick. One of more of the baseline VOI values may represent a range or may include a margin of error such that all values falling within this range or margin of error would be considered matching equivalents. Also, one or more of the equipment records 460 that includes baseline VOI values in field 464 may also include a field 466 that specifies an optimal shooting protocol suitable for extracting VOI values to be compared against the baseline VOI values.

Thus, in one embodiment, as part of executing the computer-readable instructions associated with the equipment recommendation application 210, the system processor 120A/120B attempts to identify one or more of the equipment records 460 having baseline VOI values that match the VOI values extracted by the VOI extraction process 240. In some embodiments, the at least one recommended feature can then be an indication of the identified variant (such as a particular make and model of hockey stick) and in other embodiments the at least one recommended feature may be information stored in the corresponding equipment record 460 for the identified variant (e.g., the specifications of the particular make and model of hockey stick).

Attempting to match a set of extracted VOI values with candidate sets of baseline VOI values can be achieved in various ways. For example, a distance metric can be computed between the set of extracted VOI values and the baseline VOI values associated with the equipment records 460. An objective function (e.g., minimizing a distance metric) can then be applied to find the most closely matching variant. In computing the distance, any existing distance minimizing metric can be used. The VOI values can also be weighted by predetermined coefficients indicative of the relative importance of the respective VOIs. The result may be zero, one or more than one candidate equipment records.

In another example, each of the extracted VOI values can be attributed a certain importance and then matched in that order of importance, i.e., sequentially. For example, if a first VOI corresponds to the distance between gloves when holding the stick and a second VOI corresponds to the player's age, and if the first VOI is considered a priority compared to the second VOI, then it is envisaged to first identify those of the equipment records 460 whose baseline VOI value for the first VOI matches the extracted VOI value for the first VOI before making any further comparisons. In more complex matching schemes, this may correspond to a decision tree that encodes the relative priority of the various VOIs.

It should be appreciated that by relaxing the constraints to achieve a match, it may be possible to constrain to require the equipment recommendation application 210 to identify at least one candidate equipment record.

Example 1

Distance Calculation Between Extracted VOI Values and Baseline VOI Values

By way of non-limiting example, recall the following VOIs, together with possible VOI values:

| VOI | Possible values |
| --- | --- |
| Wrist shot: Shooting style | Sweep - Sweep and Snap - Snap |
| Wrist shot: Main segment that initiates the shot | Shoulders - Trunk - Hips |
| Wrist shot: Loading stance | Front Foot - Centered - Back Foot |
| Wrist shot: Location of puck at contact relative to base of support | Front foot - Centered - Centered with blade opened |
| Wrist shot: Shoulder and trunk position relative to the shooting direction | Closed - Centered - Opened |
| Wrist shot: Upper arm dynamics | Pull back - Swing back - Supporting |
| Wrist shot: Stance at puck release | Front Support - Stable - Stance shift |
| Wrist shot: Main segment for energy generation | Shoulders - Trunk - Hips |
| Slap shot: Location of ice contact relative to the base of support | Front Support - Centered - Back Support |
| Slap shot: Location of puck at contact relative to base of support | Front foot - Knee - Centered |
| Slap shot: Position of the bottom hand relative to the front foot at contact | Past front foot - At front foot - Before front foot |
| Slap shot: Upper arm dynamics | Pull back - Swing Back - Supporting |
| Slap shot: Stance at puck release | Front Support - Stable - Stance Shift |

Consider now three families of sticks (family 1, family 2 and family 3). The families may be distinguished based on a variety of factors, such as the portion along the shaft having greater flexibility than other portions of the shaft. Each of the families may undergo testing in order to conclude which family corresponds best to a particular choice of baseline VOI value for each of the VOIs:

| VOI | Baseline VOI value for stick family 1 | Baseline VOI value for stick family 2 | Baseline VOI value for stick family 3 |
| --- | --- | --- | --- |
| Wrist shot: Shooting style | Sweep | Sweep and snap | Snap |
| Wrist shot: Main segment that initiates the shot | Shoulder | Trunk | Hips |
| Wrist shot: Loading stance | Front foot | Centered | Back Foot |
| Wrist shot: Location of puck at contact relative to base of support | Front foot | Centered | Centered and Opened |
| Wrist shot: Shoulder and trunk position relative to the shooting direction | Closed | Centered | Opened |
| Wrist shot: Upper arm dynamics | Pull Back | Swing Back | Supporting |
| Wrist shot: Stance at puck release | Front Support | Stable | Stance Shift |

| VOI | Baseline VOI value for stick family 1 | Baseline VOI value for stick family 2 | Baseline VOI value for stick family 3 |
|---|---|---|---|
| Wrist shot: Main segment for energy generation | Shoulder | Trunk | Hips |
| Slap shot: Location of ice contact relative to the base of support | Front Support | Centered | Back Support |
| Slap shot: Location of puck at contact relative to base of support | Front Foot | Knee | Centered |
| Slap shot: Position of the bottom hand relative to the front foot at contact | After front foot | At front foot | Before front foot |
| Slap shot: Upper arm dynamics | Pull back | Swing back | Supporting |
| Slap shot: Stance at puck release | Front Support | Stable | Stance shift |

Now consider that the VOI extraction algorithm 240 reveals, for a given player executing a given shooting protocol, the following extracted VOI values:

| VOI | Extracted VOI value for player |
|---|---|
| Wrist shot: Shooting style | Sweep |
| Wrist shot: Main segment that initiates the shot | Trunk |
| Wrist shot: Loading stance | Back Foot |
| Wrist shot: Location of puck at contact relative to base of support | Centered |
| Wrist shot: Shoulder and trunk position relative to the shooting direction | Closed |
| Wrist shot: Upper arm dynamics | Swing back |
| Wrist shot: Stance at puck release | Stance shift |
| Wrist shot: Main segment for energy generation | Hips |
| Slap shot: Location of ice contact relative to the base of support | Front Support |
| Slap shot: Location of puck at contact relative to base of support | Knee |
| Slap shot: Position of the bottom hand relative to the front foot at contact | At front foot |
| Slap shot: Upper arm dynamics | Swing Back |
| Slap shot: Stance at puck release | Front Support |

At this point, a distance metric between the set of extracted VOI values and the set of baseline VOI values corresponding to each of the stick families can be computed. For example, the distance metric can take into account the proximity of the each of the various extracted VOI values to the corresponding baseline VOI value, for each of the stick families. In that regard, a "proximity score" may be computed in a binary fashion for each VOI, such that each stick family accumulates a "1" when the extracted VOI value matches the baseline VOI value, and a "0" otherwise. Then, the stick family with the greatest proximity score is the selected to be the recommended stick family. For example, in the case of 3 stick families having the aforementioned baseline VOI values, the proximity score for a player having the aforementioned extracted VOI values could be computed from the following data:

| VOI | Contribution to proximity score for stick family 1 | Contribution to proximity score for stick family 2 | Contribution to proximity score for stick family 3 |
|---|---|---|---|
| For wrist shots: | | | |
| Wrist shot: Shooting style | 1 | 0 | 0 |
| Wrist shot: Main segment that initiates the shot | 0 | 1 | 0 |
| Wrist shot: Loading stance | 0 | 0 | 1 |
| Wrist shot: Location of puck at contact relative to base of support | 0 | 1 | 0 |
| Wrist shot: Shoulder and trunk position relative to the shooting direction | 1 | 0 | 0 |
| Wrist shot: Upper arm dynamics | 0 | 1 | 0 |
| Wrist shot: Stance at puck release | 0 | 0 | 1 |

-continued

| VOI | Contribution to proximity score for stick family 1 | Contribution to proximity score for stick family 2 | Contribution to proximity score for stick family 3 |
|---|---|---|---|
| Wrist shot: Main segment for energy generation | 0 | 0 | 1 |
| Sub-Total (wrist shot) | 2 | 3 | 3 |
| For slap shots: | | | |
| Slap shot: Location of ice contact relative to the base of support | 1 | 0 | 0 |
| Slap shot: Location of puck at contact relative to base of support | 0 | 1 | 0 |
| Slap shot: Position of the bottom hand relative to the front foot at contact | 0 | 1 | 0 |
| Slap shot: Upper arm dynamics | 0 | 1 | 0 |
| Slap shot: Stance at puck release | 1 | 0 | 0 |
| Sub-Total (slap shot) | 2 | 3 | 0 |

Thus it is seen that for wrist shots, stick families 2 and 3 would be better choices, whereas for slap shots, stick family 2 would be a better choice. Overall, if one simply adds the scores for the wrist shot VOIs and the slap shot VOIs, stick family 2 is the best choice for this player. Of course, weighting the wrist shot score and the slap shot score with different coefficients may lead to a different outcome as being the recommended stick family. Also, other distance metrics are possible.

Example 2

Distance Calculation Between Extracted VOI Values and Baseline VOI Values

By way of non-limiting example, the following table shows VOIs that may be extracted by the VOI extraction process 240, together with corresponding possible values:

| VOI | Possible values |
|---|---|
| Wrist shot - hand VOIs | |
| Which hand shows peak angular velocity first ? | Bottom, Top, Equal (less than 5 ms offset) |
| Which hand shows the biggest angular velocity delta ? | Bottom, Top, Equal (less than 5 ms offset) |
| Which hand shows peak resultant acceleration first ? | Bottom, Top, Equal (less than 5 ms offset) |
| Which hand shows the biggest resultant acceleration delta ? | Bottom, Top, Equal (less than 5 ms offset) |
| What is the overall hand movement time (ms) ? | >220 ms, 180-220 ms, <180 ms |
| Wrist shot - stick VOIs | |
| What is the stick overall angular displacement | >135 deg, 120-135 deg, <120 deg |
| What is the stick overall movement time (ms) | >220 ms, 180-220 ms, <180 ms |
| Which hand peaks the closest to peak stick resultant acceleration | Bottom, Top, Equal (less than 5 ms offset) |
| Which hand peaks the closest to peak stick resultant velocity | Bottom, Top, Equal (less than 5 ms offset) |
| Wrist shot - puck VOIs | |
| What is the puck impulse time (ms) | >220 ms, 180-220 ms, <180 ms |
| Which hand peaks the closest to peak puck resultant acceleration | Bottom, Top, Equal (less than 5 ms offset) |
| Which hand peaks the closest to peak puck resultant velocity | Bottom, Top, Equal (less than 5 ms offset) |
| Slap shot - hand VOIs | |
| Which hand shows peak angular velocity first ? | Bottom, Top, Equal (less than 5 ms offset) |
| Which hand shows the biggest angular velocity delta ? | Bottom, Top, Equal (less than 5 ms offset) |
| Which hand shows peak resultant acceleration first ? | Bottom, Top, Equal (less than 5 ms offset) |

-continued

| VOI | Possible values |
|---|---|
| Which hand shows the biggest resultant acceleration delta ? | Bottom, Top, Equal (less than 5 ms offset) |
| What is the overall hand movement time (ms) ? | >110 ms, 90-110 ms, <90 ms |
| Slap shot - stick VOIs | |
| What is the stick overall angular displacement | >270 deg, 230-270 deg, <230 deg |
| What is the stick overall movement time (ms) | >110 ms, 90-110 ms, <90 ms |
| Which hand peaks the closest to peak stick resultant acceleration | Bottom, Top, Equal (less than 5 ms offset) |
| Which hand peaks the closest to peak stick resultant velocity | Bottom, Top, Equal (less than 5 ms offset) |
| Slap shot - puck VOIs | |
| What is the puck impulse time (ms) | >110 ms, 90-110 ms, <90 ms |
| Which hand peaks the closest to peak puck resultant acceleration | Bottom, Top, Equal (less than 5 ms offset) |
| Which hand peaks the closest to peak puck resultant velocity | Bottom, Top, Equal (less than 5 ms offset) |

20

Consider now three families of sticks (family 1, family 2 and family 3), each of which has been found to correspond best to a particular choice of baseline VOI value for each of the VOIs:

| VOI | Baseline VOI value for stick family 1 | Baseline VOI value for stick family 2 | Baseline VOI value for stick family 3 |
|---|---|---|---|
| Wrist shot - hand VOIs | | | |
| Which hand shows peak angular velocity first ? | Bottom Hand | Equal (less than 5 ms offset) | Top Hand |
| Which hand shows the biggest angular velocity delta ? | Bottom Hand | Equal (less than 5 ms offset) | Top Hand |
| Which hand shows peak resultant acceleration first ? | Bottom Hand | Equal (less than 5 ms offset) | Top Hand |
| Which hand shows the biggest resultant acceleration delta ? | Bottom Hand | Equal (less than 5 ms offset) | Top Hand |
| What is the overall hand movement time (ms) ? | >220 ms | 180-220 ms | <180 ms |
| Wrist shot - stick VOIs | | | |
| What is the stick overall angular displacement | >135 deg | 120-135 deg | <120 deg |
| What is the stick overall movement time (ms) | >220 ms | 180-220 ms | <180 ms |
| Which hand peaks the closest to peak stick resultant acceleration | Bottom Hand | Both (less than 5 ms offset) | Top Hand |
| Which hand peaks the closest to peak stick resultant velocity | Bottom Hand | Both (less than 5 ms offset) | Top Hand |
| Wrist shot - puck VOIs | | | |
| What is the puck impulse time (ms) | >220 ms | 180-220 ms | <180 ms |
| Which hand peaks the closest to peak puck resultant acceleration | Bottom Hand | Both (less than 5 ms offset) | Top Hand |
| Which hand peaks the closest to peak puck resultant velocity | Bottom Hand | Both (less than 5 ms offset) | Top Hand |
| Slap shot - hand VOIs | | | |
| Which hand shows peak angular velocity first ? | Bottom Hand | Equal (less than 5 ms offset) | Top Hand |
| Which hand shows the biggest angular velocity delta ? | Bottom Hand | Equal (less than 5 ms offset) | Top Hand |
| Which hand shows peak resultant acceleration first ? | Bottom Hand | Equal (less than 5 ms offset) | Top Hand |

| VOI | Baseline VOI value for stick family 1 | Baseline VOI value for stick family 2 | Baseline VOI value for stick family 3 |
|---|---|---|---|
| Which hand shows the biggest resultant acceleration delta ? | Bottom Hand | Equal (less than 5 ms offset) | Top Hand |
| What is the overall hand movement time (ms) ? | >110 ms | 90-110 ms | <90 ms |
| Slap shot - stick VOIs | | | |
| What is the stick overall angular displacement | >270 deg | 230-270 deg | <230 deg |
| What is the stick overall movement time (ms) | >110 ms | 90-110 ms | <90 ms |
| Which hand peaks the closest to peak stick resultant acceleration | Bottom Hand | Both (less than 5 ms offset) | Top Hand |
| Which hand peaks the closest to peak stick resultant velocity | Bottom Hand | Both (less than 5 ms offset) | Top Hand |
| Slap shot - puck VOIs | | | |
| What is the puck impulse time (ms) | >110 ms | 90-110 ms | <90 ms |
| Which hand peaks the closest to peak puck resultant acceleration | Bottom Hand | Both (less than 5 ms offset) | Top Hand |
| Which hand peaks the closest to peak puck resultant velocity | Bottom Hand | Both (less than 5 ms offset) | Top Hand |

Now consider that the VOI extraction algorithm 240 reveals, for a given player executing a given shooting protocol, the following extracted VOI values:

| VOI | Possible values |
|---|---|
| Wrist shot - hand VOIs | |
| Which hand shows peak angular velocity first ? | Bottom |
| Which hand shows the biggest angular velocity delta ? | Equal (less than 5 ms offset) |
| Which hand shows peak resultant acceleration first ? | Bottom |
| Which hand shows the biggest resultant acceleration delta ? | Equal (less than 5 ms offset) |
| What is the overall hand movement time (ms) ? | 180-220 ms |
| Wrist shot - stick VOIs | |
| What is the stick overall angular displacement | >135 deg |
| What is the stick overall movement time (ms) | 180-220 ms |
| Which hand peaks the closest to peak stick resultant acceleration | Bottom |
| Which hand peaks the closest to peak stick resultant velocity | Equal (less than 5 ms offset) |
| Wrist shot - puck VOIs | |
| What is the puck impulse time (ms) | 180-220 ms |
| Which hand peaks the closest to peak puck resultant acceleration | Bottom |
| Which hand peaks the closest to peak puck resultant velocity | Equal (less than 5 ms offset) |
| Slap shot - hand VOIs | |
| Which hand shows peak angular velocity first ? | Bottom |
| Which hand shows the biggest angular velocity delta ? | Equal (less than 5 ms offset) |
| Which hand shows peak resultant acceleration first ? | Bottom |
| Which hand shows the biggest resultant acceleration delta ? | Equal (less than 5 ms offset) |
| What is the overall hand movement time (ms) ? | 90-110 ms |
| Slap shot - stick VOIs | |
| What is the stick overall angular displacement | >270 deg |
| What is the stick overall movement time (ms) | 90-110 ms |
| Which hand peaks the closest to peak stick resultant acceleration | Bottom |
| Which hand peaks the closest to peak stick resultant velocity | Equal (less than 5 ms offset) |
| Slap shot - puck VOIs | |
| What is the puck impulse time (ms) | 90-110 ms |
| Which hand peaks the closest to peak puck resultant acceleration | Bottom |
| Which hand peaks the closest to peak puck resultant velocity | Equal (less than 5 ms offset) |

At this point, a distance metric between the set of extracted VOI values and the set of baseline VOI values corresponding to each of the stick families can be computed. For example, the distance metric can take into account the proximity of the each of the various extracted VOI values to the corresponding baseline VOI value, for each of the stick families. In that regard, a "proximity score" may be computed in a binary fashion for each VOI, such that each stick family accumulates a "1" when the extracted VOI value matches the baseline VOI value, and a "0" otherwise. Then, the stick family with the greatest proximity score is the selected to be the recommended stick family. For example, in the case of 3 stick families having the aforementioned baseline VOI values, the proximity score for a player having the aforementioned extracted VOI values could be computed from the following data:

| VOI | Contribution to proximity score for stick family 1 | Contribution to proximity score for stick family 2 | Contribution to proximity score for stick family 3 |
|---|---|---|---|
| For wrist shots: | | | |
| Which hand shows peak angular velocity first ? | 1 | 0 | 0 |
| Which hand shows the biggest angular velocity delta ? | 0 | 1 | 0 |
| Which hand shows peak resultant acceleration first ? | 1 | 0 | 0 |
| Which hand shows the biggest resultant acceleration delta ? | 0 | 1 | 0 |
| What is the overall hand movement time (ms) ? | 0 | 1 | 0 |
| What is the stick overall angular displacement | 1 | 0 | 0 |
| What is the stick overall movement time (ms) | 0 | 1 | 0 |
| Which hand peaks the closest to peak stick resultant acceleration | 1 | 0 | 0 |
| Which hand peaks the closest to peak stick resultant velocity | 0 | 1 | 0 |
| What is the puck impulse time (ms) | 0 | 1 | 0 |
| Which hand peaks the closest to peak puck resultant acceleration | 1 | | 0 |
| Which hand peaks the closest to peak puck resultant velocity | 0 | 1 | 0 |
| Sub-Total (wrist shot) | 5 | 7 | 0 |
| For slap shots: | | | |
| Which hand shows peak angular velocity first ? | 1 | 0 | 0 |
| Which hand shows the biggest angular velocity delta ? | 0 | 1 | 0 |
| Which hand shows peak resultant acceleration first ? | 1 | 0 | 0 |
| Which hand shows the biggest resultant acceleration delta ? | 0 | 1 | 0 |
| What is the overall hand movement time (ms) ? | 0 | 1 | 0 |
| What is the stick overall angular displacement | 1 | 0 | 0 |
| What is the stick overall movement time (ms) | 0 | 1 | 0 |
| Which hand peaks the closest to peak stick resultant acceleration | 1 | 0 | 0 |
| Which hand peaks the closest to peak stick resultant velocity | 0 | 1 | 0 |
| What is the puck impulse time (ms) | 0 | 1 | 0 |
| Which hand peaks the closest to peak puck resultant acceleration | 1 | | 0 |
| Which hand peaks the closest to peak puck resultant velocity | 0 | 1 | 0 |
| Sub-Total (slap shot) | 5 | 7 | 0 |

Thus it is seen that for both wrist shots and slap shots, stick family 2 would be the best choice. If one adds the scores for the wrist shot VOIs and the slap shot VOIs, stick family 2 is the overall best choice for this player. Of course, weighting the wrist shot score and the slap shot score with different coefficients may lead to a different outcome as being the recommended stick family. Also, other distance metrics are possible.

Example 3

Conversion of Extracted VOI Values Into a Set of "Recommended Features"

In this embodiment, the system processor 120A/120B converts certain extracted VOI values into a set of features pertaining to the blade of a hockey stick which can be referred to as recommended blade specs. The manner of converting the extracted VOI values into recommended blade specs of a hockey stick may be based on prior testing.

By way of non-limiting example, the following table shows VOIs that may be extracted by the VOI extraction process 240, together with corresponding possible values:

| General VOIs | |
| --- | --- |
| VOI | Possible values |
| Shooting stance | Crouched, Normal, Upright |

| Shot-related VOIs - wrist shot or slap shot (collect separately for each type of shot) | | |
| --- | --- | --- |
| VOI | Possible values (wrist shot) | Possible values (slap shot) |
| Puck impulse time | <60 ms, 60-80 ms, 80-100 ms, >100 ms | <25 ms, 25-35 ms, 35-55 ms, >55 ms |
| Off-axis spin/Z-axis spin (percentage) | <25%, 25%-35%, >35% | <25%, 25%-35%, >35% |
| Maximum angular velocity (swing) | <1500 degrees/s, 1500-2000 degrees/s, >2000 degrees/s | <2000 degrees/s, 2000-2500 degrees/s, >2500 degrees/s |

As such, it is seen that there is a total of seven (7) extracted VOIs.

Figure 15:
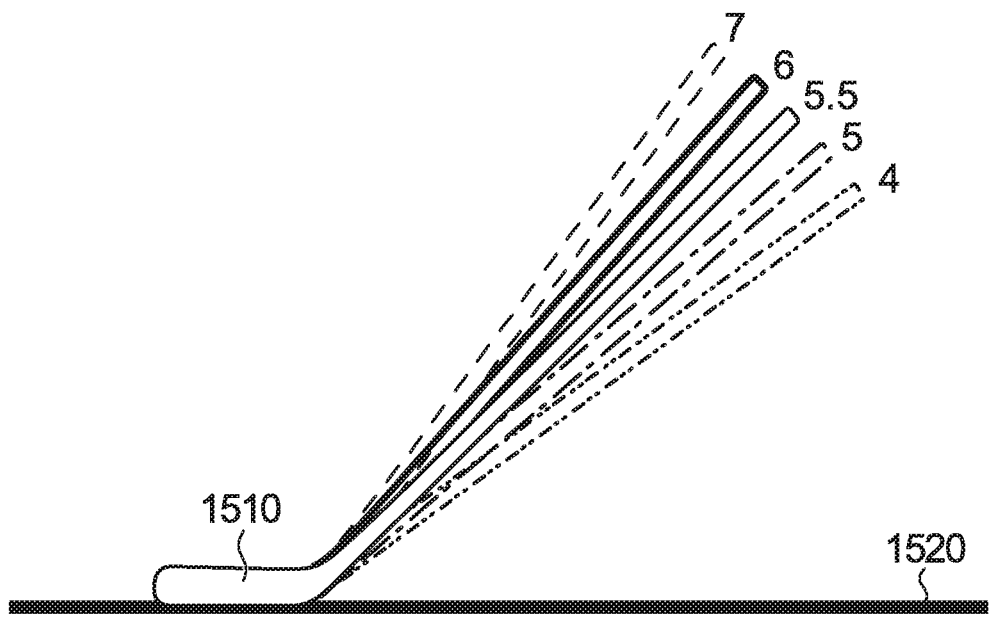
FIG. 15 is a diagram illustrating the notion of a lie angle for a hockey stick.

Consider now that a blade may have a variety of features including, in this embodiment, four (4) recommended blade specs, namely "curve", "face angle", "blade length" and 'lie angle". With reference to FIG. 15, the "lie angle" is the angle between the shaft of the stick 1510 and the ice 1520 when the blade is positioned to have maximum contact surface with the ice 1520. As the lie angle increases, this means that the angle between the stick's blade and shaft is steeper. A higher lie angle necessitates a more upright stance in order to have the most contact surface between the blade and the ice surface.

The possible values of the blade specs (on an individual basis) are as follows:

| Blade spec | Possible values |
| --- | --- |
| Curve (point of curve initiation) | Mid Heel, Mid, Mid Toe, Heel |
| Face Angle (degree of blade face opening) | Closed, Neutral, Open |
| Blade Length (overall length of blade pattern) | Mid, Long, Short, Mid Long |
| Lie angle | 5, 6, 7 |

It should be appreciated that not all combinations of blade specs are possible. For example, although there are theoretically $4\times3\times4\times3=144$ possible combinations of blade specs, a manufacturer may choose to manufacture a limited variety of hockey sticks, for example, in only one of twelve (12) possible combinations. In particular, it may not be desirable from an inventory perspective to produce sticks having all possible lie angles (which could in fact include more than 3 possibilities). In fact, in this non-limiting example, some stick models are offered with different lie angles associated with different shooting stances, whereas other stick models are offered only in a single lie angle irrespective of the shooting stance that the player may have. Thus, where more than one lie angle is available, it is within the scope of the disclosure to process sensor data characterizing the player (e.g., images or inertial motion data) an to process this data to classify the player's shooting stance into a limited number of bins (e.g., crouched, upright or normal) and to associate each bin to a lie angle.

Meanwhile, it will be observed that although there are $3\times(4\times3\times4)\times(4\times3\times4)=6912$ theoretically possible combinations of extracted VOI values, not all theoretical possibilities will arise in practice as there is an interdependence between VOIs. For example, angular velocity and puck impulse time are inversely related. Also, it is likely that someone having a very fast wrist shot will also have a moderate to fast slap shot.

As such, in one embodiment, it may be possible to perform testing or analysis to determine which combinations of extracted VOIs are most appropriate with which combinations of blade specs that are available for manufacture. In this regard, and by way of non-limiting example, FIG. 13 shows a table that could map twelve possible blade spec combinations to twelve possible combinations of extracted VOI values.

It will be seen from FIG. 13 that non-illustrated combinations of extracted VOI values may be possible, yet it may not be feasible to construct a new blade pattern with new blade specs, as this number may be limited. In this case, if one obtains, from the VOI extraction process 240, a combination of extracted VOI values that does not fit into the data of FIG. 13, an algorithm may compare the extracted VOIs to those in the table and come up with the "closest" combination of extracted VOIs to the ones that were obtained from the VOI extraction process 240, and then the blade specs for that combination will be recommended. Of course, a weighting may be implemented such that certain VOIs are prioritized and given more influence in the comparison.

Finally, each of the combinations of blade specs may be associated with a different type of blade pattern. This is shown in the leftmost column in the table of FIG. 13 in the form of a code name.

Figure 14:
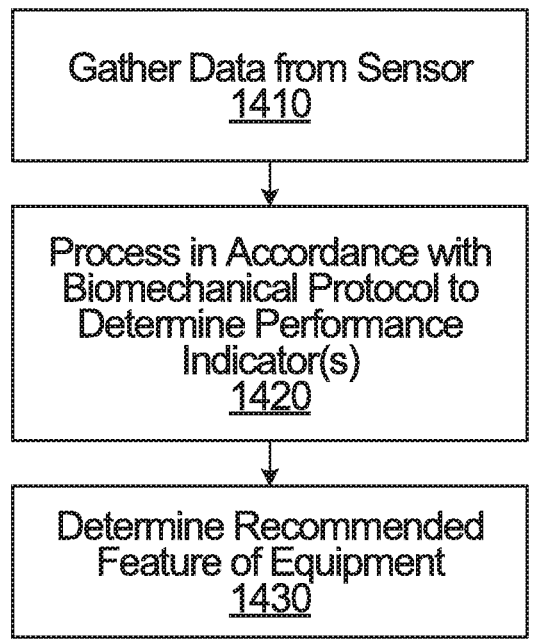
FIG. 14 is a flowchart illustrating steps in an equipment recommendation process, in accordance with a non-limiting embodiment.

As such, and with reference to FIG. 14, there has been provided a system and method for gathering sensed data from a sensor (step 1410), processing the sensed data in accordance with a biomechanical protocol to determine at least one performance indicator associated with execution of the biomechanical protocol (step 1420) and determining at least one recommended feature of an item of equipment based at least in part on the at least one performance indicator (step 1430). In a specific embodiment, images representative of execution of a hockey shot of a given type by a subject are obtained, parameters are extracted from the images, and a hockey stick recommendation for the subject is produced, based on the parameters and on the given type of hockey shot.

Other Variants

It should be appreciated that in the case of an external sensor being embedded into an item of equipment used by the player 10 during execution of the biomechanical protocol, the item of equipment containing the sensor may be of the same equipment class, or of a different equipment class, as the item of equipment being recommended by the equipment recommendation system. An equipment class refers to a set of equipment having the same function in a given activity, such as a sport. For example, in hockey, different equipment classes include hockey sticks, goalie skates, player skates and goalie pads, to name a few non-limiting examples. In baseball, different equipment classes include bats, catcher's mitts, pitcher's gloves and batter's helmets, to name a few non-limiting examples.

Those skilled in the art should further appreciate that same biomechanical protocol could be used in the recommendation of multiple types of equipment. For example, the sensed data collected during execution of the above described shooting protocol could be analyzed in two different ways (e.g., by two parallel versions of the VOI extraction process 240). For example, the sensed data may be analyzed in one way (a first VOI extraction process) in order to recommend a manufacturer and/or model of a hockey stick, and may be analyzed a different way (a second VOI extraction process) in order to recommend a manufacturer and/or model of a shoulder pads.

In other cases, the equipment recommendation system 100A/100B may be used to recommend equipment that is not being used by the individual executing the biomechanical protocol. For example, the player 10 may execute the shooting protocol using the stick 20, but the equipment recommendation system 100A/100B may be configured to recommend an anti-vibration device. More generally, the equipment recommendation system 100A/100B may be configured to recommend accessory equipment for use during execution of the technique.

Those skilled in the art will also appreciate that although reference has been made to a shooting protocol in order to recommend a hockey stick used in ice hockey, biomechanical protocols could be used and developed for the different sports/activities or different equipment. By way of an example, a biomechanical protocol could be developed for ice hockey techniques other than shooting, such as skating motion (strides). As such, the present disclosure covers embodiments in which the equipment recommendation system 100A/100B is configured to recommend a model or manufacturer or equipment characteristics of other hockey equipment, such as skates (including player skates and goalie skates) or protective equipment (leg pads, shoulder pads, helmets, gloves) or other sports equipment (tennis racquets, lacrosse sticks, baseball bats, squash racquets, golf clubs, etc.) or other equipment in general (harnesses, helmets, etc.).

Also, a biomechanical protocol could be developed for techniques in other sports, such as a swing in lacrosse, baseball or tennis (whereby the equipment recommendation system 100A/100B may be configured to determine recommended features of a lacrosse stick, baseball bat or tennis racquet) or a running stride (whereby the equipment recommendation system 100A/100B may be configured to determine recommended features of a running shoe). Furthermore, a biomechanical protocol could be developed for techniques in non-sporting activities, such as acquired maneuvers executed by firefighters, construction workers or medical personnel (whereby the equipment recommendation system 100A/100B may be configured to determine recommended features of an item of firefighting equipment, construction equipment or medical/surgical equipment). Moreover, a biomechanical protocol could be developed for techniques that apply to elderly or disabled persons, such as getting out of bed, walking upstairs, etc. (whereby the equipment recommendation system 100A/100B may be configured to determine recommended features of an item of paramedical equipment).

Although the above description has focused on certain processes being performed by certain processors, this has been done in order to simplify the description. Those skilled in the art will appreciate that the processes may be distributed across multiple processors and may be performed by different processors. For example, in embodiments where the computer-readable instructions corresponding to the sensed data capture process 230 are executed by the processor 620 of the sensor 160B, the computer-readable instructions corresponding to the VOI extraction process 240 may also be executed by the processor 620 of the same sensor 160B, provided the identified shooting protocol is known so that the correct parameters for the VOI extraction process 240 may be chosen.

Various operational embodiments are provided herein. In some cases, one or more of the operations described may constitute computer readable instructions stored on one or more computer readable media, which if executed by a computing device, will cause the computing device to perform the operations described. The order in which some or all of the operations are described should not be construed as to imply that these operations are necessarily order-dependent. Alternative ordering will be appreciated by one skilled in the art having the benefit of this description. Further, it will be understood that not all operations are necessarily present in each embodiment provided herein.

Finally, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components, the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A computer-implemented method for recommending and providing a hockey stick to a subject who performs a shooting protocol corresponding to a sequence of shots taken with a sample hockey stick, wherein the shooting protocol is characterized by execution of the sequence of shots that includes at least one wrist shot and at least one slap shot, comprising:

sensing with a plurality of sensors the subject's taking of the sequence of shots with the sample hockey stick;

operating at least one computer for:

gathering sensed data from the sensors corresponding to the subject's taking of the sequence of shots with the sample hockey stick;

processing the sensed data in accordance with the shooting protocol to determine at least one performance indicator, wherein the processing comprises aligning time series of the sensed data derived from the sensors;

determining at least one recommended hockey stick feature for the hockey stick based at least in part on the at least one performance indicator;

consulting a database of hockey stick records associated with known hockey sticks to determine if a particular one of the hockey stick records matches the at least one recommended hockey stick feature for the hockey stick;

in response to determining that the particular one of the hockey stick records matches the at least one recommended hockey stick feature for the hockey stick, outputting information identifying a particular one of the known hockey sticks associated with the particular one of the hockey stick records as the hockey stick recommended to the subject via a graphical user interface; and in response to determining that none of the hockey stick records matches the at least one recommended hockey stick feature for the hockey stick: utilizing the at least one recommended hockey stick feature for the hockey stick to generate a customized hockey stick; and outputting information identifying the customized hockey stick as the hockey stick recommended to the subject via the graphical user interface;

and providing the hockey stick to the subject according to the information identifying the particular one of the known hockey sticks or the information identifying the customized hockey stick.

2. The computer-implemented method defined in claim 1, wherein the at least one recommended hockey stick feature includes a blade pattern of the hockey stick.

3. The computer-implemented method defined in claim 1, wherein the at least one recommended hockey stick feature includes a resistance to flex of a shaft of the hockey stick.

4. The computer-implemented method defined in claim 1, further comprising obtaining a height and a weight of the subject, wherein the determining is a function of the height and the weight of the subject.

5. The computer-implemented method defined in claim 1, wherein gathering sensed data from the sensors comprises obtaining data from at least one inertial motion sensor attached to an equipment of the subject.

6. The computer-implemented method defined in claim 1, wherein gathering sensed data from the sensors comprises obtaining data from at least one inertial motion sensor set into motion by the subject.

7. The computer-implemented method defined in claim 1, wherein the at least one performance indicator associated with execution of the shooting protocol includes an indication of at least one of:

a puck impulse time during execution of a hockey shot; and a maximum angular velocity of the sample hockey stick during execution of a hockey shot.

8. The computer-implemented method defined in claim 1, wherein the sensed data includes images, and the processing the sensed data comprises applying pattern recognition to time sequences of images.

9. The computer-implemented method defined in claim 1, wherein at least part of the processing the sensed data occurs during execution of the shooting protocol.

10. The computer-implemented method defined in claim 1, wherein all of the processing the sensed data occurs after execution of the shooting protocol has completed.

11. The computer-implemented method defined in claim 1, further comprising receiving an input from a user, the input specifying the shooting protocol from a plurality of shooting protocols.

12. The computer-implemented method defined in claim 11, further comprising issuing instructions to the subject to carry out the shooting protocol.

13. The computer-implemented method defined in claim 1, wherein the at least one recommended hockey stick feature comprises a set of recommended features, the method further comprising:

comparing the set of recommended features with predefined sets of features that characterize respective variants of the hockey stick; and identifying at least one of the variants as a candidate variant based on the comparing.

14. The computer-implemented method defined in claim 13, wherein identifying at least one of the variants based on the comparing comprises identifying as a candidate variant a variant for which the corresponding set of features most closely matches the set of recommended features.

15. The computer-implemented method defined in claim 1, wherein the at least one performance indicator comprises a plurality of performance indicators, and wherein determining at least one recommended hockey stick feature based at least in part on the at least one performance indicator comprises:

comparing the performance indicators to sets of baseline values corresponding to respective variants of the hockey stick; and identifying at least one of the variants based on the comparing;

wherein the at least one recommended hockey stick feature comprises an indication of the at least one identified variant.

16. The computer-implemented method defined in claim 15, wherein each variant is characterized by a combination of equipment features and wherein the indication of the at least one identified variant comprises at least one of the equipment features that characterizes the at least one identified variant.

17. The computer-implemented method defined in claim 15, wherein identifying at least one of the variants based on the comparing comprises identifying a variant for which the corresponding baseline values most closely match the performance indicators.

18. The computer-implemented method defined in claim 15, wherein the comparing comprises scoring the variants to obtain a score for each of the variants, and wherein the identifying at least one of the variants comprises identifying a variant for which the score is highest.

19. The computer-implemented method defined in claim 1, wherein the at least one performance indicator associated with execution of the shooting protocol includes an indication of at least one of:
   a distance between the subject's hands on the hockey stick; and
   hand movement time during execution of a hockey shot.

20. The computer-implemented method defined in claim 1, wherein the at least one performance indicator associated with execution of the shooting protocol includes an indication of at least one of:
   a shooting stance of the subject; and
   a portion of a body of the subject that is a main segment for energy generation.

21. The computer-implemented method defined in claim 1, comprising establishing a relative importance of hockey stick properties, wherein the determining the at least one recommended hockey stick feature for the hockey stick based at least in part on the at least one performance indicator comprises determining the at least one recommended hockey stick feature for the hockey stick based at least in part on the at least one performance indicator and the relative importance of the hockey stick properties.

22. The computer-implemented method defined in claim 21, wherein the establishing the relative importance of hockey stick properties comprises weighing the hockey stick properties based on predetermined coefficients indicative of the relative importance of the hockey stick properties.

23. The computer-implemented method defined in claim 21, wherein each of the at least one performance indicator is represented by a respective hockey stick property and a value of the respective hockey stick property;
   the establishing the relative importance of hockey stick properties comprises establishing a decision tree that encodes the relative importance of hockey stick properties;
   the determining at least one recommended hockey stick feature comprises comparing values of the respective hockey stick properties associated with the at least one performance indicator with predefined reference values of the respective hockey stick properties in an order that is defined by the decision tree.

24. The method of claim 1, wherein processing the sensed data comprises calculating at least one of estimated movement linear velocities, displacement, angular displacement, and angular acceleration of each of at least one wrist shot and the at least one slap shot.

25. The method of claim 1, wherein processing the sensed data comprises determining respective coordination patterns of the plurality of sensors.

26. A system configured to recommend and provide a hockey stick to a subject who performs a shooting protocol corresponding to a sequence of shots taken with a sample hockey stick, wherein the shooting protocol is characterized by execution of the sequence of shots that includes at least one wrist shot and at least one slap shot, comprising:
   a plurality of sensors configured to sense the subject's taking of the sequence of shots with the sample hockey stick; and
   a processor coupled to the plurality of sensors and configured:
   to gather sensed data from the plurality of sensors corresponding to the subject's taking of the sequence of shots with the sample hockey stick,
   and
   to process the sensed data in accordance with the shooting protocol to determine at least one performance indicator, wherein the sensed data is processed by aligning time series of the sensed data derived from the plurality of sensors;
   to determine at least one recommended hockey stick feature for the hockey stick based at least in part on the at least one performance indicator;
   to consult a database of hockey stick records associated with known hockey sticks to determine if a particular one of the hockey stick records matches the at least one recommended hockey stick feature for the hockey stick;
   in response to determining that the particular one of the hockey stick records matches the at least one recommended hockey stick feature for the hockey stick, to cause a graphical user interface to output information identifying a particular one of the known hockey sticks associated with the particular one of the hockey stick records as the hockey stick recommended to the subject; and
   in response to determining that none of the hockey stick records matches the at least one recommended hockey stick feature for the hockey stick: to utilize the at least one recommended hockey stick feature for the hockey stick to generate a customized hockey stick; and cause the graphical user interface to output information identifying the customized hockey stick as the hockey stick recommended to the subject; and
   to cause the hockey stick to be provided to the subject according to the information identifying the particular one of the known hockey sticks or the information identifying the customized hockey stick.

27. An equipment recommendation system configured to recommend and provide a hockey stick to a subject who performs a shooting protocol corresponding to a sequence of shots taken with a sample hockey stick, wherein the shooting protocol is characterized by execution of the sequence of shots that includes at least one wrist shot and at least one slap shot, comprising:
   a plurality of cameras configured to produce images representative of the execution of the shooting protocol by the subject with the sample hockey stick;
   an I/O interface; and
   a processor connected to the plurality of cameras via the I/O interface and configured to extract parameters from the images,
   to process the extracted parameters in accordance with the shooting protocol to determine at least one performance indicator, wherein the extracted parameters are processed by aligning time series of the extracted parameters derived from the plurality of cameras;
   to determine at least one recommended hockey stick feature for the hockey stick based at least in part on the at least one performance indicator;
   to consult a database of hockey stick records associated with known hockey sticks to determine if a particular one of the hockey stick records matches the at least one recommended hockey stick feature for the hockey stick;

in response to determining that the particular one of the hockey stick records matches the at least one recommended hockey stick feature for the hockey stick, to output, via the I/O interface, information identifying a particular one of the known hockey sticks associated with the particular one of the hockey stick records as the hockey stick recommended to the subject; and in response to determining that none of the hockey stick records matches the at least one recommended hockey stick feature for the hockey stick: to utilize the at least one recommended hockey stick feature for the hockey stick to generate a customized hockey stick; and to output, via the I/O interface, information identifying the customized hockey stick as the hockey stick recommended to the subject:

to cause the hockey stick to be provided to the subject according to the information identifying the particular one of the known hockey sticks or the information identifying the customized hockey stick.

28. A method for providing a hockey stick to a subject who performs a shooting protocol corresponding to a sequence of shots taken with a sample hockey stick, wherein the shooting protocol is characterized by execution of the sequence of shots that includes at least one wrist shot and at least one slap shot, the method comprising:

sensing, with a plurality of sensors, the subject's taking of the sequence of shots with the sample hockey stick;

gathering, with at least one computer, sensed data from the sensors corresponding to the subject's taking of the sequence of shots with the sample hockey stick;

processing, with the at least one computer, the sensed data in accordance with the shooting protocol to determine at least one performance indicator, wherein the processing comprises aligning time series of the sensed data derived from the sensors;

determining, with the at least one computer, at least one recommended hockey stick feature for the hockey stick based at least in part on the at least one performance indicator;

consulting, with the at least one computer, a database of hockey stick records associated with known hockey sticks to identify a particular one of the hockey stick records that matches the at least one recommended hockey stick feature for the hockey stick;

outputting, via a graphical user interface of the at least one computer, information identifying a particular one of the known hockey sticks associated with the particular one of the hockey stick records as the hockey stick recommended for the subject; and providing the hockey stick to the subject based on the information identifying the particular one of the known hockey sticks.

29. The method defined in claim 28, wherein the at least one recommended hockey stick feature includes a blade pattern of the hockey stick.

30. The method defined in claim 28, further comprising obtaining a height and a weight of the subject, wherein the determining is a function of the height and the weight of the subject.

* * * * *